US012151389B2

(12) United States Patent
Sugiyama et al.

(10) Patent No.: US 12,151,389 B2
(45) Date of Patent: Nov. 26, 2024

(54) CUTTING DEVICE

(71) Applicant: BROTHER KOGYO KABUSHIKI KAISHA, Nagoya (JP)

(72) Inventors: Kentaro Sugiyama, Gifu (JP); Yasuhito Shikama, Niwa (JP)

(73) Assignee: BROTHER KOGYO KABUSHIKI KAISHA, Nagoya (JP)

( * ) Notice: Subject to any disclaimer, the term of this patent is extended or adjusted under 35 U.S.C. 154(b) by 355 days.

(21) Appl. No.: 17/583,449

(22) Filed: Jan. 25, 2022

(65) Prior Publication Data

US 2022/0281129 A1 Sep. 8, 2022

Related U.S. Application Data

(63) Continuation of application No. PCT/JP2020/012283, filed on Mar. 19, 2020.

(30) Foreign Application Priority Data

Jul. 26, 2019 (JP) ................................ 2019-138263

(51) Int. Cl.
*B26D 5/00* (2006.01)
*B26D 7/02* (2006.01)
*B26D 7/26* (2006.01)

(52) U.S. Cl.
CPC ............ *B26D 5/007* (2013.01); *B26D 7/025* (2013.01); *B26D 7/2614* (2013.01); *B26D 2005/002* (2013.01); *B26D 2007/2678* (2013.01)

(58) Field of Classification Search
CPC . B26D 5/00; B26D 5/007; B26D 5/20; B26D 5/22; B26D 2005/002; B26D 2007/2678
See application file for complete search history.

(56) References Cited

U.S. PATENT DOCUMENTS 11,213,966 B2 * 1/2022 Sugiyama ............ B26D 7/2628
11,904,489 B2 * 2/2024 Sugiyama ............ B26D 7/2614
(Continued)

FOREIGN PATENT DOCUMENTS

JP H05104497 A 4/1993
JP 2005246562 A 9/2005
(Continued)

OTHER PUBLICATIONS

International Search Report issued in connection with International Application No. PCT/JP2020/012283, mailed on Jun. 23, 2020 (2 pages).

(Continued)

*Primary Examiner* — Adam J Eiseman
*Assistant Examiner* — Richard D Crosby, Jr.
(74) *Attorney, Agent, or Firm* — K&L Gates LLP

(57) ABSTRACT

A cutting device decides a cutting pressure correspondence value corresponding to a pressure applied to a mounting portion of a cutting blade when cutting an object to be cut using the cutting blade based on a first pressure correspondence value corresponding to the pressure applied to the mounting portion when it is detected that the cutting blade has come into contact with the object to be cut in the course of the mounting portion, and on a second pressure correspondence value corresponding to the pressure applied to the mounting portion when it is detected that the cutting blade has reached a holding surface of the holding member of the object to be cut. A cutting device applies the pressure to the mounting portion based on the cutting pressure correspondence value and cuts the object to be cut using the cutting blade mounted to the mounting portion.

12 Claims, 15 Drawing Sheets

(56) References Cited

U.S. PATENT DOCUMENTS

| | | | | |
|---|---|---|---|---|
| 2005/0186010 | A1 | 8/2005 | Takeya et al. | |
| 2013/0104713 | A1* | 5/2013 | Kawaguchi | B26F 1/3813 83/76.1 |
| 2014/0000429 | A1* | 1/2014 | Fujihara | B26D 5/06 83/76.6 |
| 2014/0182432 | A1* | 7/2014 | Muto | B26D 5/005 83/76.7 |
| 2014/0352511 | A1* | 12/2014 | Yamanashi | G05B 19/409 700/114 |
| 2015/0027285 | A1* | 1/2015 | Okuyama | B26F 1/3813 83/72 |
| 2020/0016784 | A1 | 1/2020 | Kentaro et al. | |
| 2021/0008747 | A1 | 1/2021 | Kentaro et al. | |

FOREIGN PATENT DOCUMENTS

| | | | |
|---|---|---|---|
| JP | 2007136612 | A | 6/2007 |
| JP | 2017109251 | A | 6/2017 |
| JP | 2018171669 | A | 11/2018 |
| WO | 2019188117 | A1 | 10/2019 |

OTHER PUBLICATIONS

International Preliminary Report on Patentability in corresponding International Patent Application No. PCT/JP2020/012283, mailed Feb. 10, 2022 (11 pages).

* cited by examiner

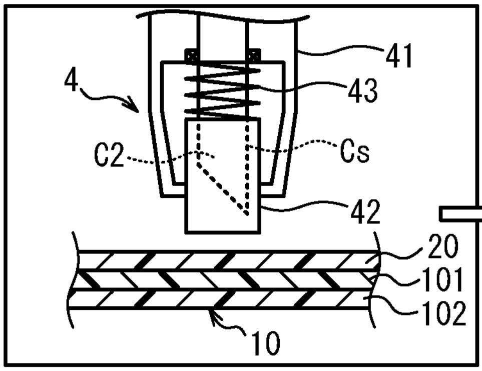
FIG. 6A
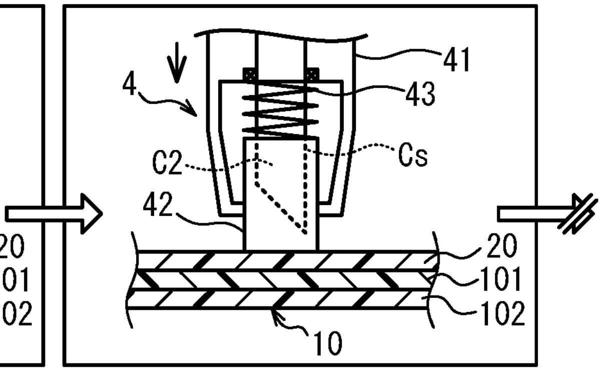
FIG. 6B
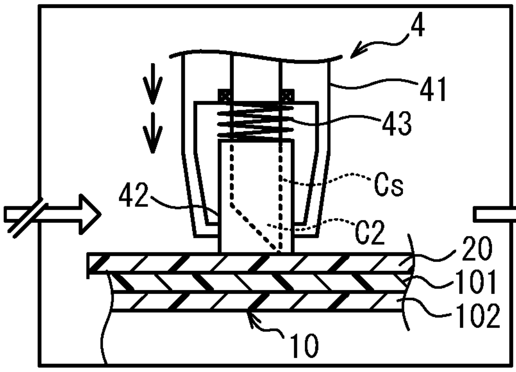
FIG. 6C
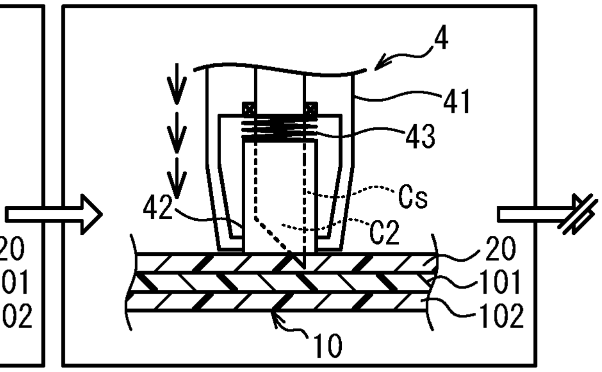
FIG. 6D
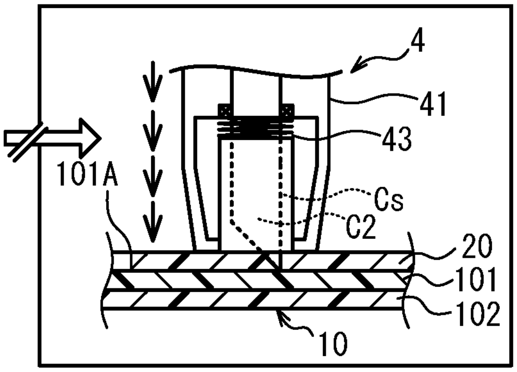
FIG. 6E
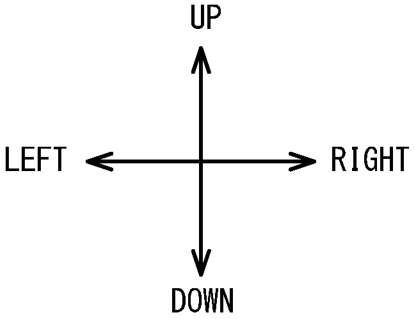

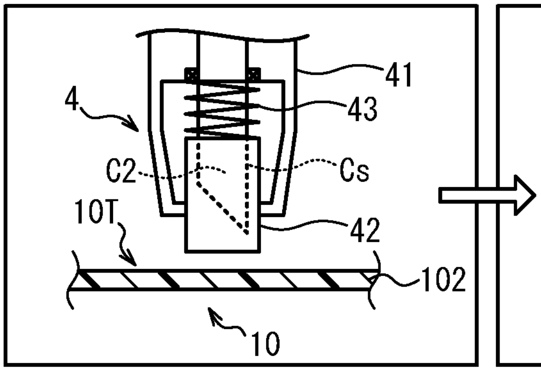
FIG. 9A
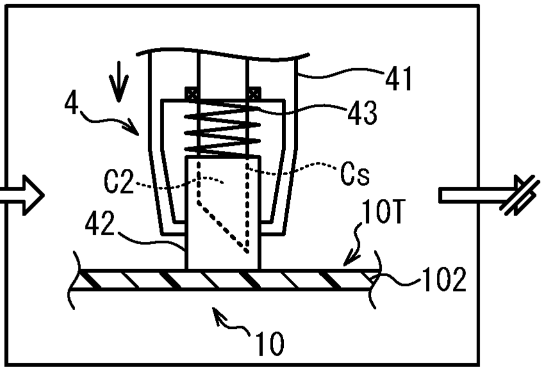
FIG. 9B
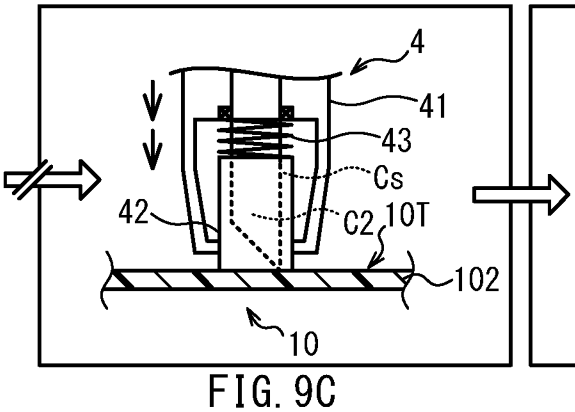
FIG. 9C
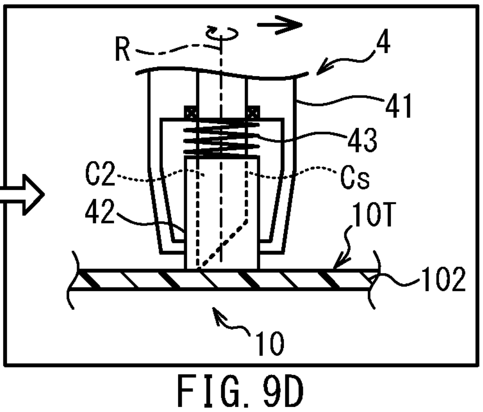
FIG. 9D
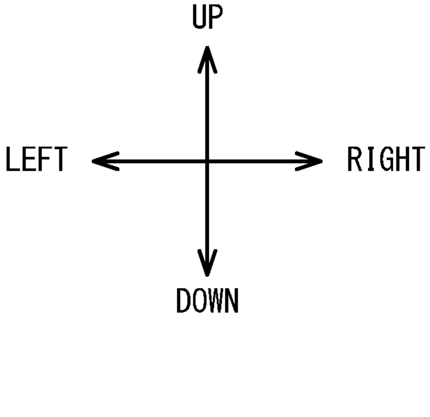

FIG. 14

| CUTTING DATA | | | | | |
|---|---|---|---|---|---|
| CUTTING ORDER | LINE SEGMENT | POSITION | START COORDINATES | POSITION | END COORDINATES |
| 1 | L11 | Q0 | (X11, Y11) | Q1 | (X12, Y12) |
| 2 | L2 | Q1 | (X12, Y12) | Q2 | (X13, Y13) |
| 3 | L3 | Q2 | (X13, Y13) | Q3 | (X14, Y14) |
| 4 | L4 | Q3 | (X14, Y14) | Q4 | (X15, Y15) |
| 5 | L12 | Q4 | (X15, Y15) | Q0 | (X11, Y11) |

CUTTING DEVICE

CROSS-REFERENCE TO RELATED APPLICATION

This application is a Continuing Application of International Application No. PCT/JP2020/012283, filed Mar. 19, 2020, which claims priority from Japanese Patent Application No. 2019-138263, filed on Jul. 26, 2019. This disclosure of the foregoing application is hereby incorporated by reference in its entirety.

BACKGROUND

The present disclosure relates to a cutting device capable of cutting an object to be cut.

A cutting device is known that cuts a pattern from a sheet-like object to be cut by moving the object to be cut and a cutting blade relative to each other in accordance with cutting data. The cutting device is provided with a storage device that stores various setting conditions, individually, in accordance with a type that indicates a hardness, a thickness, and the like of the object to be cut, reads out, from the storage device, the setting conditions corresponding to the type of the object to be cut, and cuts the object to be cut on the basis of the read out setting conditions.

SUMMARY

In the known cutting device, the setting conditions set on the basis of the type stored in the storage device may sometimes not correspond to the actual object to be cut. In this case, the cutting device cannot appropriately cut the object to be cut.

The object of the present disclosure is to provide a cutting device capable of cutting an object to be cut under conditions suited to the object to be cut.

Various embodiments herein provide a cutting device that includes a platen, a mounting portion, a first movement mechanism, a second movement mechanism, a pressure applying mechanism, a processor, and a memory. The platen is placeable on a holding member. The holding member is configured to hold an object to be cut on a holding surface of the holding member. The mounting portion is mountable to a cutting blade. The first movement mechanism is configured to relatively move the holding member placed on the platen and the mounting portion in a first direction and a second direction orthogonal to the first direction. The second movement mechanism is configured to move the mounting portion in a third direction causing the mounting portion to move closer to the platen, and a fourth direction causing the mounting portion to move away from the platen. The third direction and the fourth direction are orthogonal to the first direction and the second direction. The pressure applying mechanism is configured to apply pressure to the mounting portion in the third direction. The processor is configured to control the first movement mechanism and the second movement mechanism. The memory is configured to store computer-readable instructions. When the instructions are executed by the processor, the instructions instruct the processor to perform processes including first movement processing, second movement processing, first decision processing, acquisition processing, and cutting processing. The first movement processing moves the mounting portion, by controlling the first movement mechanism and the second movement mechanism, to a facing position. The facing position is a position facing the object to be cut held by the holding member and at which the cutting blade is away from the object to be cut in the fourth direction. The second movement processing moves the mounting portion in the third direction from the facing position by controlling the second movement mechanism. The first decision processing decides a cutting pressure correspondence value corresponding to the pressure applied to the mounting portion by the pressure applying mechanism when cutting the object to be cut using the cutting blade. The deciding is performed based on a first pressure correspondence value corresponding to the pressure applied to the mounting portion by the pressure applying mechanism when it is detected that the cutting blade has come into contact with the object to be cut in the course of the mounting portion being moved in the third direction by the second movement processing, and on a second pressure correspondence value corresponding to the pressure applied to the mounting portion by the pressure applying mechanism when it is detected that the cutting blade has reached the holding surface of the holding member. The acquisition processing acquires cutting data for cutting a pattern from the object to be cut. The cutting processing applies the pressure to the mounting portion by the pressure applying mechanism, based on the cutting pressure correspondence value decided by the first decision processing, and cuts the object to be cut using the cutting blade mounted to the mounting portion, by controlling the first movement mechanism and the second movement mechanism in accordance with the cutting data acquired by the acquisition processing.

BRIEF DESCRIPTION OF THE DRAWINGS

Embodiments of the disclosure will be described below in detail with reference to the accompanying drawings in which:

FIG. 6A to FIG. 6E are explanatory diagrams describing positional relationships between the housing tip end of the cartridge, and a holding member and an object to be cut;

FIG. 9A to FIG. 9D are explanatory diagrams describing positional relationships between the housing tip end of the cartridge and the holding member 10;

FIG. 14 is a diagram showing a cutting table; and

DETAILED DESCRIPTION OF EMBODIMENTS

Embodiments embodying the present disclosure will be described in order with reference to the drawings. The drawings to be referenced are used to illustrate the technical features that can be adopted in the present disclosure, and the described structures and the like of the devices are not intended to be limited thereto, but are merely explanatory examples.

Overview of Cutting Device 1

Figure 1:
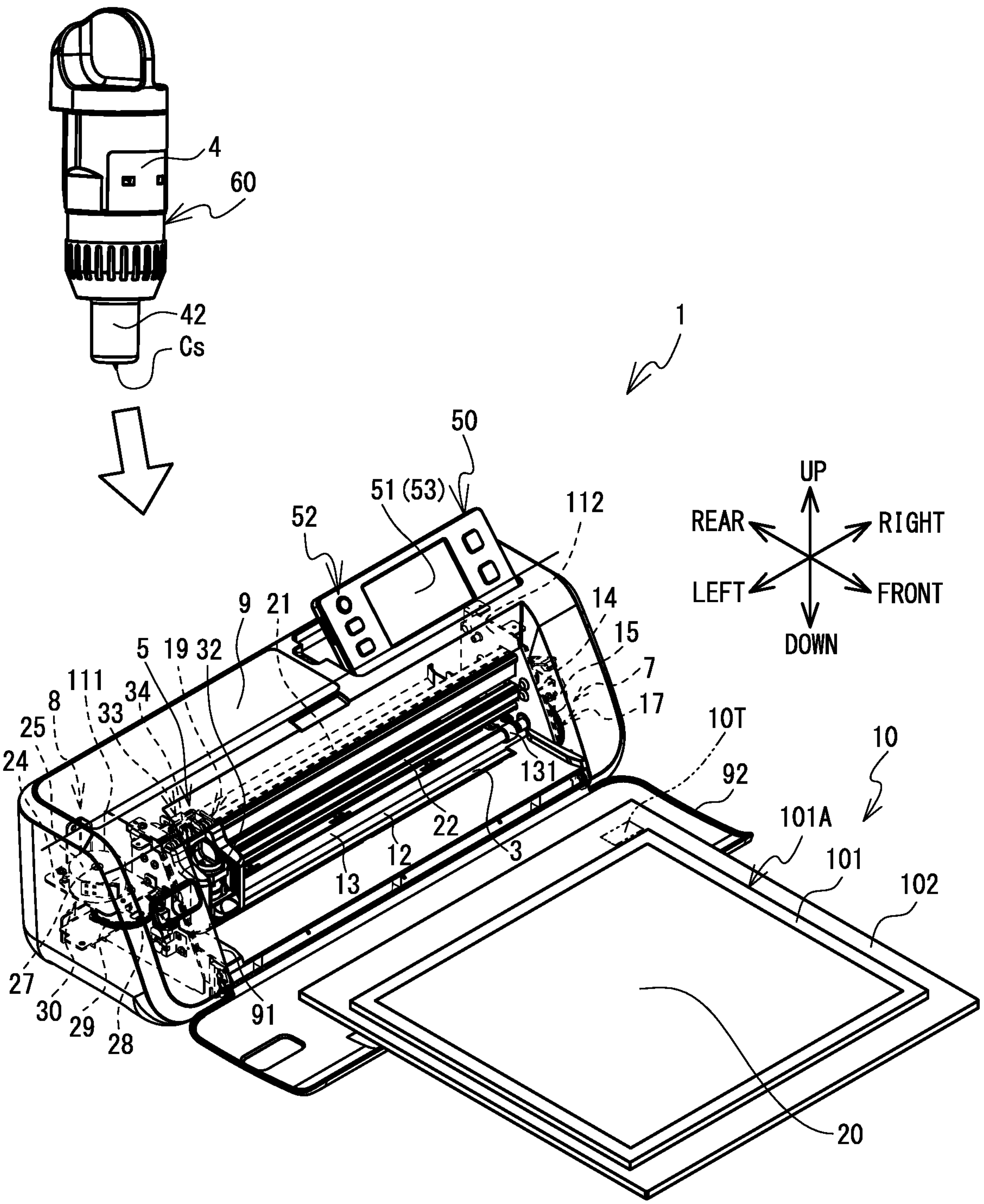
FIG. 1 is a perspective view of a cutting device.

An overview of a cutting device 1 will be described with reference to FIG. 1 to FIG. 3. The cutting device 1 is used in a state fitted with a cartridge 4 including a cutting blade Cs. When the cutting device 1 is fitted with the cartridge 4, the cutting device 1 can cut a sheet-like object to be cut 20 using the cutting blade Cs. The lower left side, the upper right side, the lower right side, the upper left side, the upper side, and the lower side in FIG. 1 are the left side, the right side, the front side, the rear side, the upper side, and the lower side, respectively, of the cutting device 1 and the cartridge 4.

Figure 5:
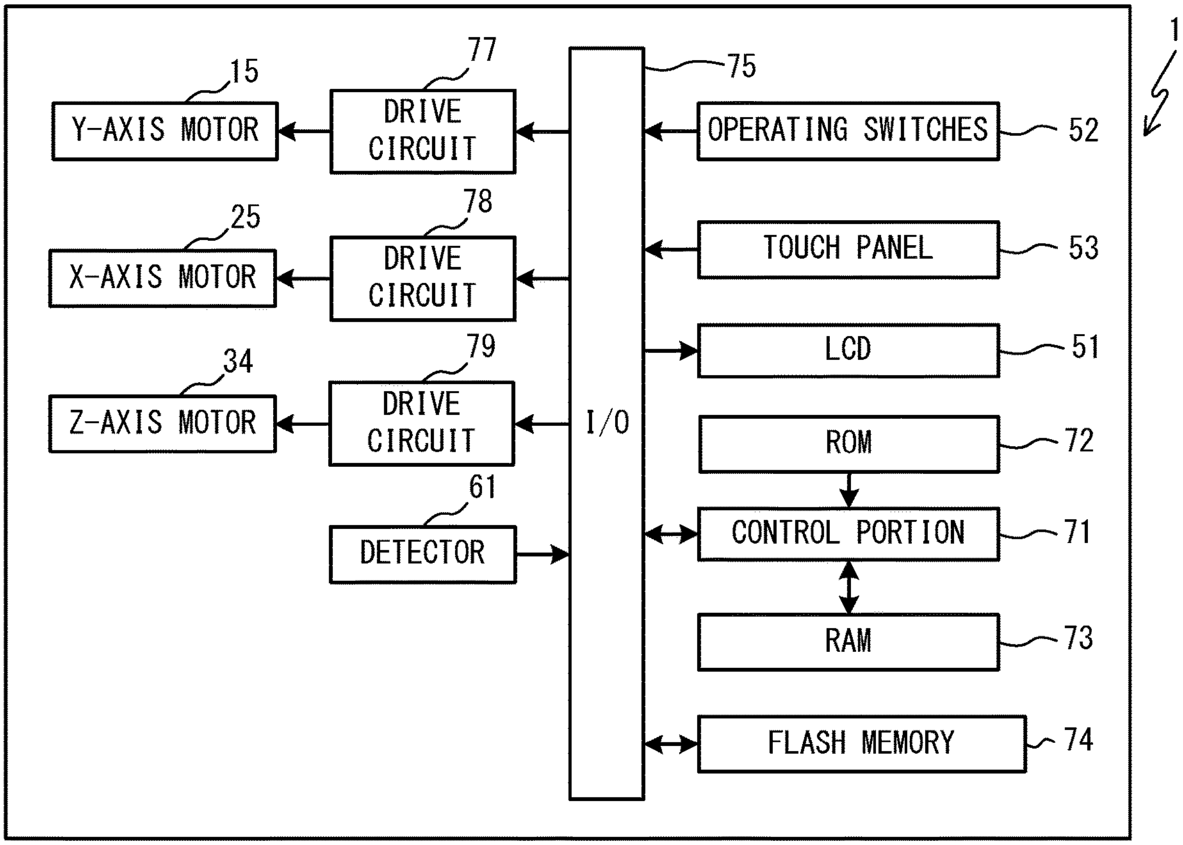
FIG. 5 is a block diagram showing an electrical configuration of the cutting device.

The cutting device 1 is provided with a main body cover 9, a platen 3, a head 5, a conveyance mechanism 7, a movement mechanism 8, a holding member 10, and a control portion 71 (refer to FIG. 5). The holding member 10 is conveyed in the front-rear direction by the cutting device 1, in a posture in which the lengthwise direction of the holding member 10 is the front-rear direction. The holding member 10 has a rectangular shape, and the object to be cut 20 is held on the upper surface of the holding member 10. The holding member 10 will be described in detail later. The main body cover 9 is provided with an opening 91, a cover 92, and an operating portion 50. The opening 91 is an opening provided in a front surface portion of the main body cover 9. A lower end side of the cover 92 is supported by the main body cover 9 so as to be able to rotate. In FIG. 1, the cover 92 is open such that the opening 91 is open.

The operating portion 50 is provided with a liquid crystal display (LCD) 51, a plurality of operating switches 52, and a touch panel 53. An image including various items, such as commands, illustrations, setting values, and messages is displayed on the LCD 51. The touch panel 53 is provided on the surface of the LCD 51. A user performs a pressing operation (hereinafter, this operation is referred to as a "panel operation") on the touch panel 53, using either a finger or a stylus pen. In the cutting device 1, which of the items has been selected is recognized in accordance with a pressed position detected by the touch panel 53. The user can use the operating switches 52 and the touch panel 53 to select a pattern displayed on the LCD 51, set various parameters, perform an input operation, and the like.

The platen 3 is provided inside the main body cover 9. The platen 3 is a plate-shaped member that extends in the left-right direction. The platen 3 receives the lower surface of the holding member 10, and the holding member 10 that holds the object to be cut 20 can be placed on the platen 3. The holding member 10 is set on the platen 3 while the opening 91 is open.

The head 5 is provided with a carriage 19, a mounting portion 32, a detector 61 (refer to FIG. 3), and an up-down drive mechanism 33. The mounting portion 32 is able to be fitted with the cartridge 4. The cartridge 4 is fixed to the mounting portion 32 in a state in which the cutting blade Cs is arranged on the lower end of the cartridge 4.

The up-down drive mechanism 33 moves the mounting portion 32 in a direction in which the mounting portion 32 moves toward the holding member 10 (i.e. downward), and a direction in which the mounting portion 32 moves away from the holding member 10 (i.e. upward). In this way, the up-down drive mechanism 33 moves the cartridge 4 mounted to the mounting portion 32 in the up-down direction. The up-down drive mechanism 33 is provided with a Z-axis motor 34 and a transmission member. The up-down drive mechanism 33 uses the transmission member coupled to an output shaft 40 of the Z-axis motor 34 to decelerate and convert a rotational movement of the Z-axis motor 34 into an up-down movement, transmits the up-down movement to the mounting portion 32, and drives the mounting portion 32 and the cartridge 4 in the up-down direction (also referred to as a Z direction). In other words, the Z-axis motor 34 drives the mounting portion 32 and the cartridge 4 in the up-down direction.

Figure 2:
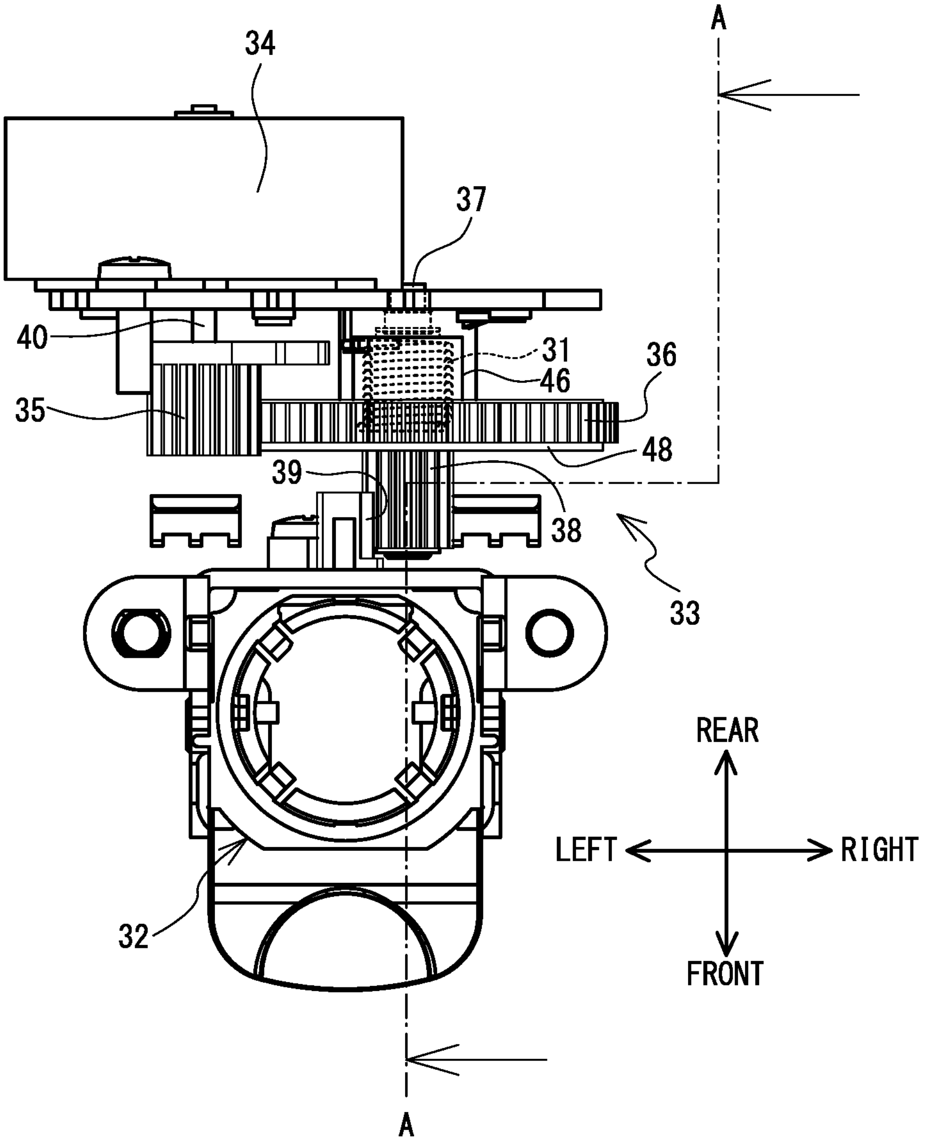
FIG. 2 is a plan view of a mounting portion and an up-down drive mechanism.
Figure 3:
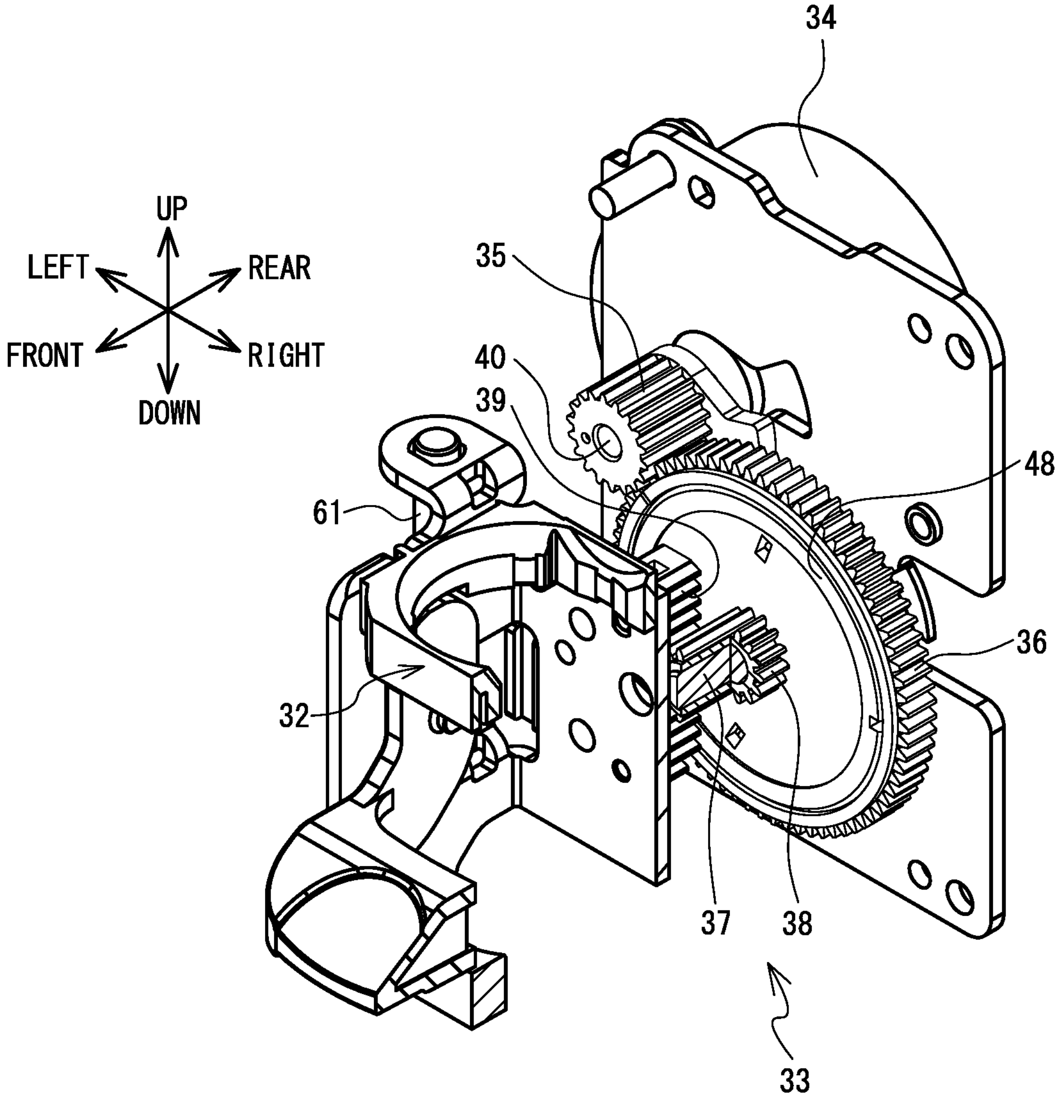
FIG. 3 is a perspective view of the mounting portion and the up-down drive mechanism cut along a line A-A shown in FIG. 2.

As shown in FIG. 2 and FIG. 3, the up-down drive mechanism 33 includes, as transmission members, gears 35 and 36, a shaft 37, a plate portion 48, a pinion 38, and a rack 39. The gear 35 is fixed to a front end of the output shaft 40 of the Z-axis motor 34. The gear 35 meshes with the gear 36. A diameter of the gear 35 is smaller than a diameter of the gear 36. The gear 36 includes a cylindrical shaft portion 46 that extends in the front-rear direction. The shaft 37 is inserted through the shaft portion 46 of the gear 36. The output shaft 40 of the Z-axis motor 34 and the shaft 37 extend in the front-rear direction. The plate portion 48 is a disc-shaped plate that is slightly smaller than the diameter of the gear 36. A front end portion of the plate portion 48 is coupled to a rear end portion of the pinion 38. The plate portion 48 is a member that is integrated with the pinion 38. The plate portion 48 is a member that is separate from the gear 36. The plate portion 48 and the pinion 38 can rotate independently of the rotation of the gear 36. The shaft 37 is inserted through the pinion 38 and the plate portion 48, to the front of the gear 36. The pinion 38 and the plate portion 48 can rotate relative to the shaft 37. The diameter of the pinion 38 is smaller than the diameters of the gears 35 and 36. The rack 39 extends in the up-down direction, and gear teeth with which the pinion 38 meshes are provided on the right surface of the rack 39. The rack 39 is fixed to the rear surface of the mounting portion 32.

The up-down drive mechanism 33 is further provided with a pressure applying mechanism 31. The pressure applying mechanism 31 is a torsion spring that is inserted through the shaft portion 46 of the gear 36. The pressure applying mechanism 31 is a mechanism that can apply a downward pressure to the mounting portion 32. One end of the pressure applying mechanism 31 is fixed to the shaft portion 46, and the other end is fixed to the plate portion 48. The pressure applying mechanism 31 transmits the rotation of the gear 36 to the plate portion 48. The pressure applying mechanism 31 applies the downward pressure to the mounting portion 32, by using an elastic force when the torsion spring is compressed in accordance with the rotation of the gear 36. The downward pressure applied to the mounting portion 32 changes in accordance with a compression amount of the torsion spring changing.

The detector 61 is a position sensor that can output a position, in the up-down direction, of the mounting portion 32. The detector 61 is disposed to the left and rear of the mounting portion 32. The detector 61 can identify the position of the mounting portion 32 in the up-down direction, and can output a signal indicating the identified position.

As shown in FIG. 1, the conveyance mechanism 7 conveys the object to be cut 20 held by the holding member 10 in a sub-scanning direction orthogonal to a main scanning direction, described later, by conveying the holding member 10 in the sub-scanning direction. The main scanning direction and the sub-scanning direction in this example are the left-right direction and the front-rear direction, respectively. The conveyance mechanism 7 is configured to be able to convey the holding member 10 set on the platen 3 in the front-rear direction (also referred to as a Y direction) of the cutting device 1. The conveyance mechanism 7 conveys the object to be cut 20 held by the holding member 10 in the sub-scanning direction. The conveyance mechanism 7 is provided with a driving roller 12, a pinch roller 13, an attachment frame 14, a Y-axis motor 15, and a deceleration mechanism 17. A pair of side wall portions 111 and 112 are provided facing each other, inside the main body cover 9. The side wall portion 111 is positioned to the left of the platen 3. The side wall portion 112 is positioned to the right of the platen 3. The driving roller 12 and the pinch roller 13 are rotatably supported between the side wall portions 111 and 112. The driving roller 12 and the pinch roller 13 transport the holding member 10. The driving roller 12 and the pinch roller 13 extend in the left-right direction (also referred to as an X direction) of the cutting device 1, and are aligned in the up-down direction. A roller portion (not shown in the drawings) is provided on the left end of the pinch roller 13, and a roller portion 131 is provided on the right end of the pinch roller 13.

The attachment frame 14 is fixed to the outer surface side (the right side) of the side wall portion 112. The Y-axis motor 15 is attached to the attachment frame 14. An output shaft of the Y-axis motor 15 is fixed to a driving gear (not shown in the drawings) of the deceleration mechanism 17. The driving gear meshes with a driven gear (not shown in the drawings). The driven gear is anchored to a leading end of a right end portion of the driving roller 12.

When the holding member 10 is conveyed, the outer left portion of the holding member 10 is sandwiched between the driving roller 12 and the left roller portion (not shown in the drawings) of the pinch roller 13. The outer right portion of the holding member 10 is sandwiched between the driving roller 12 and the roller portion 131. When the Y-axis motor 15 is driven forward or in reverse, the rotational movement of the Y-axis motor 15 is transmitted to the driving roller 12 via the deceleration mechanism 17. That is, the Y-axis motor 15 drives the driving roller 12. As a result, the holding member 10 is conveyed forward or rearward.

The movement mechanism 8 is configured to be able to move the head 5 in a direction orthogonal to the conveyance direction of the holding member 10, i.e., in the X direction. That is, the movement direction of the head 5 is orthogonal to the conveyance direction of the holding member 10. The movement mechanism 8 is provided with a pair of upper and lower guide rails 21 and 22, an attachment frame 24, an X-axis motor 25, a driving gear 27 and a driven gear 29 as a deceleration mechanism, a transmission mechanism 30, and the like. The guide rails 21 and 22 are fixed between the side wall portions 111 and 112. The guide rails 21 and 22 are positioned to the rear of, and above, the pinch roller 13. The guide rails 21 and 22 extend substantially parallel to the pinch roller 13, i.e., in the X direction. The carriage 19 of the head 5 is supported by the guide rails 21 and 22 so as to be able to move in the X direction along the guide rails 21 and 22.

The attachment frame 24 is fixed to the outer surface side (the left side) of the side wall portion 111. The X-axis motor 25 is attached so as to be oriented downward, to the rear of the attachment frame 24. The driving gear 27 is fixed to an output shaft of the X-axis motor 25. The driven gear 29 meshes with the driving gear 27. Although not shown in the drawings, the transmission mechanism 30 includes a left and right pair of timing pulleys, and an endless timing belt that is stretched over the left and right pair of timing pulleys. A timing pulley 28 that is one of the timing pulleys is provided on the attachment frame 24, such that the timing pulley 28 can rotate integrally with the driven gear 29. The other timing pulley is provided on the attachment frame 14. The timing belt extends in the X direction and is coupled to the carriage 19.

The movement mechanism 8 moves the cartridge 4 mounted to the mounting portion 32 of the head 5 in the main scanning direction. The movement mechanism 8 converts the rotational movement of the X-axis motor 25 into motion in the X direction, and transmits this motion to the carriage 19. When the X-axis motor 25 is driven forward or in reverse, the rotational movement of the X-axis motor 25 is transmitted to the timing belt via the driving gear 27, the driven gear 29, and the timing pulley 28. In this way, the carriage 19 is moved to the left or to the right by the X-axis motor 25. In other words, the conveyance mechanism 7 and the movement mechanism 8 move the mounting portion 32 in the front-rear direction (the sub-scanning direction) and the left-right direction (the main scanning direction) with respect to the holding member 10.

Holding Member 10

As shown in FIG. 1, the holding member 10 includes a first holding portion 101 and a second holding portion 102. Each of the first holding portion 101 and the second holding portion 102 has a plate shape. The first holding portion 101 has a substantially rectangular shape, and is orthogonal to the up-down direction. The first holding portion 101 is a urethane gel mat, and is softer than the object to be cut 20. The second holding portion 102 has a rectangular shape and is orthogonal to the up-down direction. The second holding portion 102 is formed of a synthetic resin, for example, and is harder than the first holding portion 101. The lengths in the front-rear direction and the left-right direction of the second holding portion 102 are longer, respectively, than the lengths of the first holding portion 101 in the front-rear direction and the left-right direction. The second holding portion 102 can hold the first holding portion 101 as a result of the first holding portion 101 being caused to come into contact with and adhere to the upper surface of the second holding portion 102.

By adhering the object to be cut 20 to the upper surface of the first holding portion 101 using the self-adhesive properties of the urethane gel mat, the first holding portion 101 can hold the object to be cut 20 from below. Hereinafter, the upper surface of the first holding portion 101 on which the object to be cut 20 is held is referred to as a "holding surface 101A."

By conveying the second holding portion 102 in a state of holding the first holding portion 101, the conveyance mechanism 7 causes the mounting portion 32 and the first holding portion 101 to move relative to each other in the front-rear direction. In this way, the conveyance mechanism 7 can cause the object to be cut 20 held on the holding surface 101A and the mounting portion 32 to move relative to each other in the front-rear direction.

Overview of Cartridge 4

Figure 4:
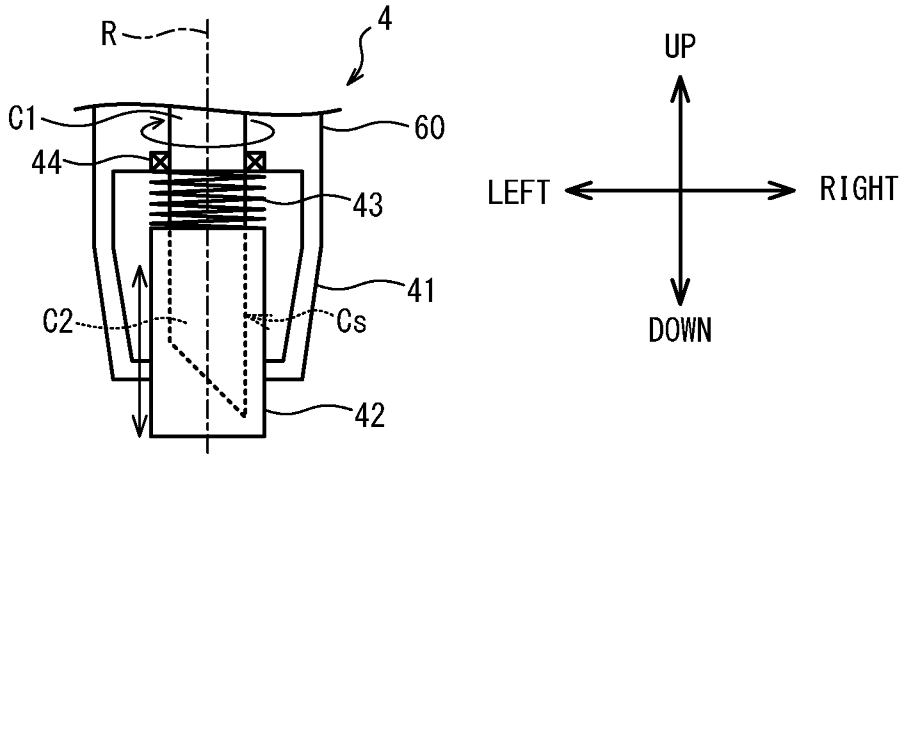
FIG. 4 is a diagram showing a configuration of a housing tip end of a cartridge.

An overview of the cartridge 4 will be explained with reference to FIG. 4. The cartridge 4 includes a cylindrical housing 60 (refer to FIG. 1). A holder 42, a spring 43, the cutting blade Cs, and a bearing 44 are provided on the tip end of the housing 60 (hereinafter referred to as a housing tip end 41).

The holder 42 is cylindrically shaped, and extends in the up-down direction. The holder 42 is held so as to be able to move in the up-down direction with respect to the housing tip end 41. The spring 43 is provided at the upper end portion of the holder 42. The spring 43 urges the holder 42 downward. The lower end portion of the holder 42 protrudes downward from the housing tip end 41. The cutting blade Cs includes a base portion C1, and a blade tip portion C2 connected to the lower end of the base portion C1. The base portion C1 has a round columnar shape, and is fixed to the housing tip end 41 via the bearing 44. The bearing 44 rotatably supports the cutting blade Cs, with a rotational axis R extending in the up-down direction as a center of rotation. The cutting blade Cs rotates centered on the rotational axis R in accordance with the action of an external force. The blade tip portion C2 has a plate shape, and a tip end thereof is inclined with respect to the horizontal direction. At least a part of the blade tip portion C2 is contained inside the holder 42.

When cutting the object to be cut 20 using the cartridge 4, by pressing the cartridge 4 against the object to be cut 20 with the cartridge 4 oriented downward, the holder 42 moves upward in resistance to the urging force of the spring 43. The tip end portion (hereinafter referred to as the tip end of the cutting blade Cs) of the blade tip portion C2 of the cutting blade Cs is exposed from the holder 42 (refer to FIG. 6, to be described later). In this way, the cartridge 4 is able to cut the object to be cut 20 using the exposed tip end of the cutting blade Cs. A direction extending horizontally along the plate-shaped blade tip portion C2 corresponds to a direction in which the cutting by the cutting blade Cs is possible. Hereinafter, this direction is referred to as a blade tip direction. A cutting method of the object to be cut 20 by the cartridge 4 will be described in detail later.

Electrical Configuration of Cutting Device 1

An electrical configuration of the cutting device 1 will be explained with reference to FIG. 5. The cutting device 1 is provided with the control portion 71, a ROM 72, a RAM 73, and an input/output (I/O) interface 75. The control portion 71 is electrically connected to the ROM 72, the RAM 73, and the I/O interface 75. The control portion 71 is a CPU that performs overall control of the cutting device 1, along with the ROM 72 and the RAM 73. The ROM 72 stores various programs used to operate the cutting device 1. The RAM 73 temporarily stores arithmetic calculation results and the like calculated by the control portion 71.

Further, a flash memory 74, the LCD 51, the operating switches 52, the touch panel 53, the detector 61, and drive circuits 77 to 79 are connected to the I/O interface 75. The flash memory 74 is a non-volatile storage element that stores various parameters, cutting data, and the like.

The cutting data represents control conditions of the up-down drive mechanism 33, the conveyance mechanism 7, and the movement mechanism 8 for cutting the object to be cut 20 using the cutting blade Cs (refer to FIG. 1) and cutting out a desired pattern. The cutting data includes start coordinates and end coordinates for controlling the conveyance mechanism 7 and the movement mechanism 8, for each of line segments included in the pattern. An origin point of a coordinate system is a point to the rear left of a region in which the cutting is possible. The left-right direction is set as the X direction, and the front-rear direction is set as the Y direction. The cutting data is stored in the flash memory 74 for each of patterns that are a target of the cutting.

The LCD 51 can perform notification of various commands. The detector 61 outputs the signal indicating the position, in the up-down direction, of the mounting portion 32. The drive circuits 77 to 79 respectively drive the Y-axis motor 15, the X-axis motor 25, and the Z-axis motor 34. The control portion 71 drives the Y-axis motor 15, the X-axis motor 25, and the Z-axis motor 34 via the drive circuits 77 to 79, and thus controls the conveyance mechanism 7, the movement mechanism 8, and the up-down drive mechanism 33. In this way, the control portion 71 moves the mounting portion 32 and the holding member 10 relative to each other.

Method of Detecting Contact of Cutting Blade Cs with Object to be Cut 20 and Holding Member 10

The control portion 71 of the cutting device 1 detects contact of the cutting blade Cs with the object to be cut 20 and the holding member 10 when the mounting portion 32 to which the cartridge 4 is mounted is moved downward, using the following method. Note that, in the following explanation, it is assumed that the object to be cut 20 is held on the holding surface 101A of the holding member 10, and the cartridge 4 is mounted to the mounting portion 32. Hereinafter, a position, in the up-down direction, of the mounting portion 32 that has moved to an uppermost position is referred to as a reference position.

By rotating the Z-axis motor 34 of the up-down drive mechanism 33, the control portion 71 moves the mounting portion 32 downward. Here, the Z-axis motor 34 is a pulse motor and there is a correlation between a number of pulses input to the Z-axis motor 34 and the downward pressure acting on the mounting portion 32 from the pressure applying mechanism 31 (refer to FIG. 2). In the present embodiment, a cumulative number of the pulses input to the Z-axis motor 34 is used as a pressure correspondence value corresponding to the pressure applied the mounting portion 32 from the pressure applying mechanism 31. In other words, the cumulative number of the pulses input to the Z-axis motor 34 from a state in which the mounting portion 32 is placed at the reference position is used as the pressure correspondence value. As shown in FIG. 2 and FIG. 3, the output shaft 40 and the gears 35 and 36 rotate in accordance with the pulse being input to the Z-axis motor 34, and the pressure applying mechanism 31 transmits the rotation of the gear 36 to the plate portion 48. The control portion 71 counts the number of pulses input to the Z-axis motor 34 when the mounting portion 32 moves downward, and acquires the pressure correspondence value, and, at the same time, acquires a position of the mounting portion 32 on the basis of the signal output from the detector 61.

As shown in FIG. 6A, in a state in which the holder 42 of the cartridge 4 is not in contact with the object to be cut 20, an upward pressure is not applied to the mounting portion 32 to which the cartridge 4 is mounted. Thus, when the output shaft 40 of the Z-axis motor 34 has rotated, the pressure applying mechanism 31 transmits the rotation of the gear 36 to the plate portion 48 and the pinion 38. The plate portion 48 and the pinion 38 rotate by the same amount as the rotation of the gear 36. As a result, the mounting portion 32 moves downward.

Figure 7:
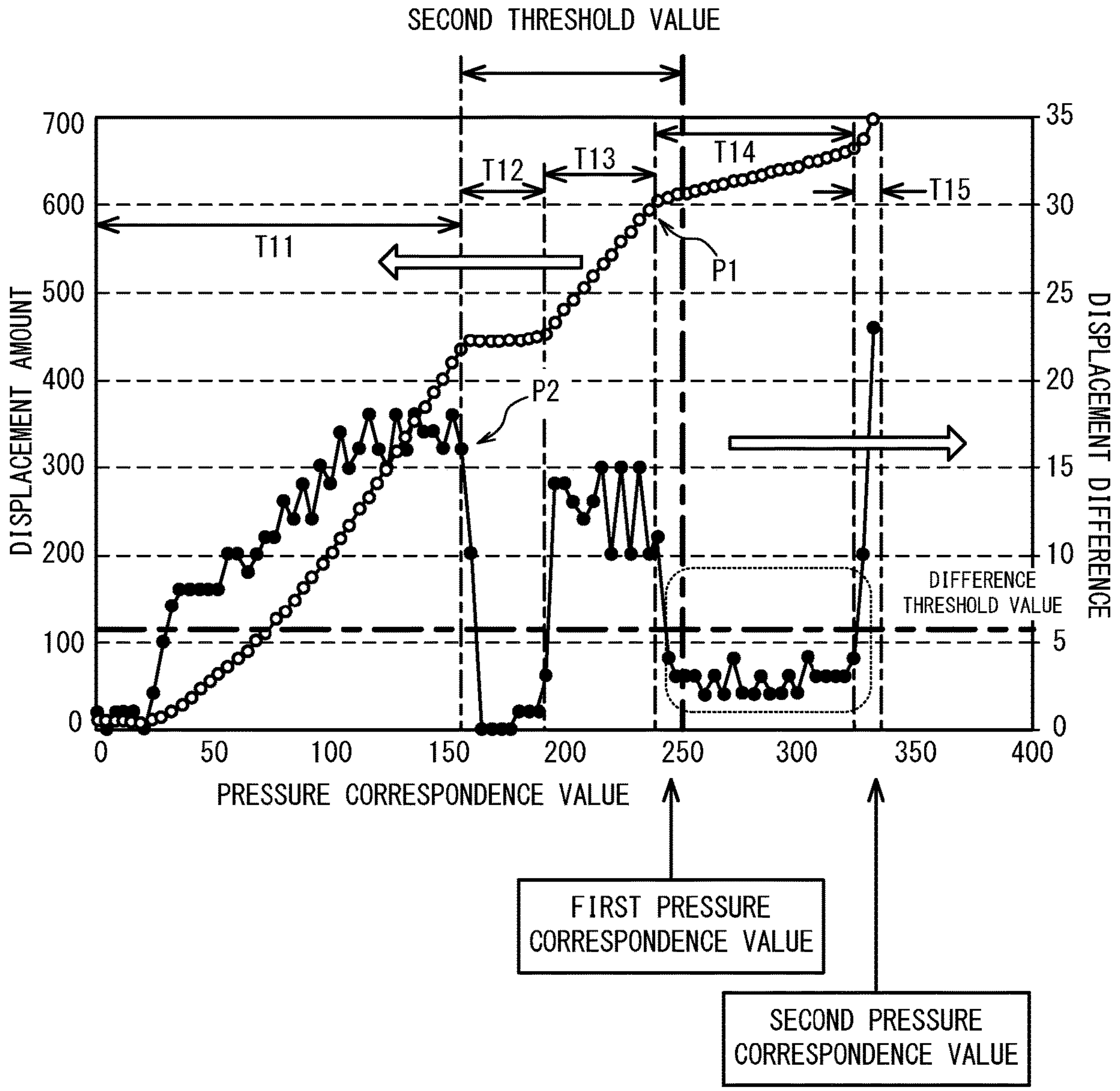
FIG. 7 is a graph showing a relationship between a pressure correspondence value, and a displacement amount and a displacement difference.

FIG. 7 shows a relationship between the pressure correspondence value, a displacement amount (the left axis, a plot P1), and a displacement difference (the right axis, a plot P2). The displacement amount indicates a displacement amount from the reference position of the mounting portion 32. The displacement difference is a difference between the displacement amounts of the mounting portion 32 corresponding to each of two consecutive outputs of the pulses to the Z-axis motor 34. The displacement difference corresponds to a movement amount per pulse, of the mounting portion 32 that moves each time the pulse is input to the Z-axis motor 34. For convenience, units of the displacement amount and the displacement difference are referred to as a unit.

In the course of the mounting portion 32 moving downward, during a period until the holder 42 comes into contact with the object to be cut 20 (refer to FIG. 6A), as shown by the plot P1 in a region T11, the displacement amount becomes larger as the pressure correspondence value increases. Further, as shown by the plot P2 in the region T11, excepting immediately after the start of the movement of the mounting portion 32 (where the pressure correspondence value is from 0 to approximately 30), the displacement difference fluctuates at values larger than a predetermined value (6 units, for example). Hereinafter, the predetermined value is referred to as a difference threshold value.

As shown in FIG. 6B, in the course of the mounting portion 32 moving downward, when the holder 42 of the cartridge 4 has come into contact with the object to be cut 20, the upward pressure acts on the mounting portion 32. By pulses being continuously input to the Z-axis motor 34, the output shaft 40 rotates further. The gear 36 rotates relative to the plate portion 48 and the pinion 38, and the torsion of the pressure applying mechanism 31 increases. In accordance with the rotation of the gear 36 being transmitted to the plate portion 48, the downward pressure acting on the mounting portion 32 by the pressure applying mechanism 31 gradually increases. However, the plate portion 48 and the pinion 38 do not rotate until the downward pressure acting on the mounting portion 32 exceeds the upward pressure applied to the mounting portion 32. In this case, the mounting portion 32 does not move downward. Thus, as shown by the plot P1 in a region T12 in FIG. 7, even if the pressure correspondence value increases, the displacement amount fluctuates at a constant level (approximately 450 units). Further, as shown by the plot P2 in the region T12, the displacement difference is smaller than the difference threshold value.

When the pulses are continuously input to the Z-axis motor 34 and the output shaft 40 rotates further, the gear 36 rotates relative to the plate portion 48 and the pinion 38, and the torsion of the pressure applying mechanism 31 increases further. The downward pressure from the pressure applying mechanism 31 acting on the mounting portion 32 via the plate portion 48 and the pinion 38 increases further. Then, when the downward pressure from the pressure applying mechanism 31 acting on the mounting portion 32 exceeds the upward pressure applied to the mounting portion 32, the pinion 38 rotates, and the downward movement of the mounting portion 32 re-starts (refer to FIG. 6B and FIG. 6C). Note that, since the downward movement of the holder 42 is suppressed, the cutting blade Cs moves downward relative to the holder 42, and the spring 43 is compressed. The downward pressure from the pressure applying mechanism 31 acting on the mounting portion 32 moves the mounting portion 32 downward in resistance to the upward pressure that accords with an elastic force of the spring 43. Thus, as shown by the plot P1 in a region T13 in FIG. 7, the displacement amount becomes larger as the pressure correspondence value increases. Further, as shown by the plot P2 in the region T13, the displacement difference once more fluctuates at values greater than the difference threshold value.

As shown in FIG. 6C, in the course of the mounting portion 32 moving further downward, when the cutting blade Cs of the cartridge 4 comes into contact with the object to be cut 20, the upward pressure acts on the mounting portion 32. By pulses being continuously input to the Z-axis motor 34, the output shaft 40 rotates further. The gear 36 rotates relative to the plate portion 48 and the pinion 38, and the torsion of the pressure applying mechanism 31 increases. In this state, the mounting portion 32 continues to move downward, and the blade tip of the cutting blade Cs penetrates into the object to be cut 20 (refer to FIG. 6D). Since the mounting portion 32 moves downward while receiving the upward pressure, a downward movement speed of the mounting portion 32 is suppressed compared to before the cutting blade Cs comes into contact with the object to be cut 20 (refer to FIG. 6B). Thus, as shown by the plot P1 in a region T14 in FIG. 7, a rate of increase (a gradient) of the displacement amount is gentler than the rate of increase (the gradient) of the displacement amount in the region T13. Further, as shown by the plot P2 in the region T14, the displacement difference becomes smaller than the difference threshold value.

The blade tip of the cutting blade Cs of the cartridge 4 passes through the object to be cut 20 and reaches the holding surface 101A of the holding member 10. As shown in FIG. 6E, the cutting blade Cs comes into contact with the first holding portion 101 of the holding member 10. Here, the first holding portion 101 is softer than the object to be cut 20. As a result, in contrast to when the blade tip of the cutting blade Cs comes into contact with the object to be cut 20 (refer to FIG. 6C), the upward pressure acting on the mounting portion 32 is suppressed, and the mounting portion 32 moves downward more easily. Thus, as shown by the plot P1 in a region T15 in FIG. 7, the rate of increase (the gradient) of the displacement amount is steeper than the rate of increase (the gradient) of the displacement amount in the region T14. Further, as shown by the plot P2 in the region T15, the displacement difference becomes larger than the difference threshold value.

Thus, in the course of the mounting portion 32 moving downward, on the basis of the distribution of the displacement difference in each of the regions T11 to T15 shown in FIG. 7, the control portion 71 can identify when the holder 42 has come into contact with the object to be cut 20 (refer to FIG. 6B), when the blade tip of the cutting blade Cs has come into contact with the object to be cut 20 (refer to FIG. 6C), and when the blade tip of the cutting blade Cs has reached the holding surface 101A of the holding member 10 (refer to FIG. 6E).

Main processing executed by the control portion 71 of the cutting device 1 will be explained with reference to FIG. 8. When a command for specifying a pattern and starting the cutting operation is input by a panel operation, the main processing is started by the control portion 71 reading out a program stored in the ROM 72 and executing the program. In the main processing, first, the pressure correspondence value (hereinafter referred to as a cutting pressure correspondence value) for applying the pressure to the mounting portion 32 using the pressure applying mechanism 31 when cutting the object to be cut 20 is determined (S11 to S39, S43). After that, the object to be cut 20 is cut on the basis of the determined cutting pressure correspondence value (S41, S45, S47, refer to FIG. 12). Note that, before the above-described panel operation, the holding member 10 is set on the platen 3, and the object to be cut 20 is held by the holding surface 101A of the holding member 10. Further, the cartridge 4 is mounted to the mounting portion 32. The mounting portion 32 is disposed at the reference position.

When the main processing has been started, first, the control portion 71 performs the following initial setting processing (S11).

In the initial setting processing, the control portion 71 controls the conveyance mechanism 7 and the movement mechanism 8, and disposes the mounting portion 32 to which the cartridge 4 is mounted at a position above an adjustment region 10T (refer to FIG. 1) of the second holding portion 102 of the holding member 10. The adjustment region 10T is a chosen region, of the second holding portion 102, at which the first holding portion 101 is not held, and, in the present embodiment, is to the right and the rear of the first holding portion 101. Next, the control portion 71 controls the up-down drive mechanism 33 and moves the mounting portion 32 downward from the reference position. Further, the control portion 71 counts the number of pulses input to the Z-axis motor 34 when the mounting portion 32 moves downward, acquires the pressure correspondence value, and, at the same time, acquires the position of the mounting portion 32 in the up-down direction on the basis of the signal output from the detector 61. Further, the control portion 71 calculates the displacement amount and the displacement difference for each of the pressure correspondence values, on the basis of the acquired position of the mounting portion 32.

Figure 10:
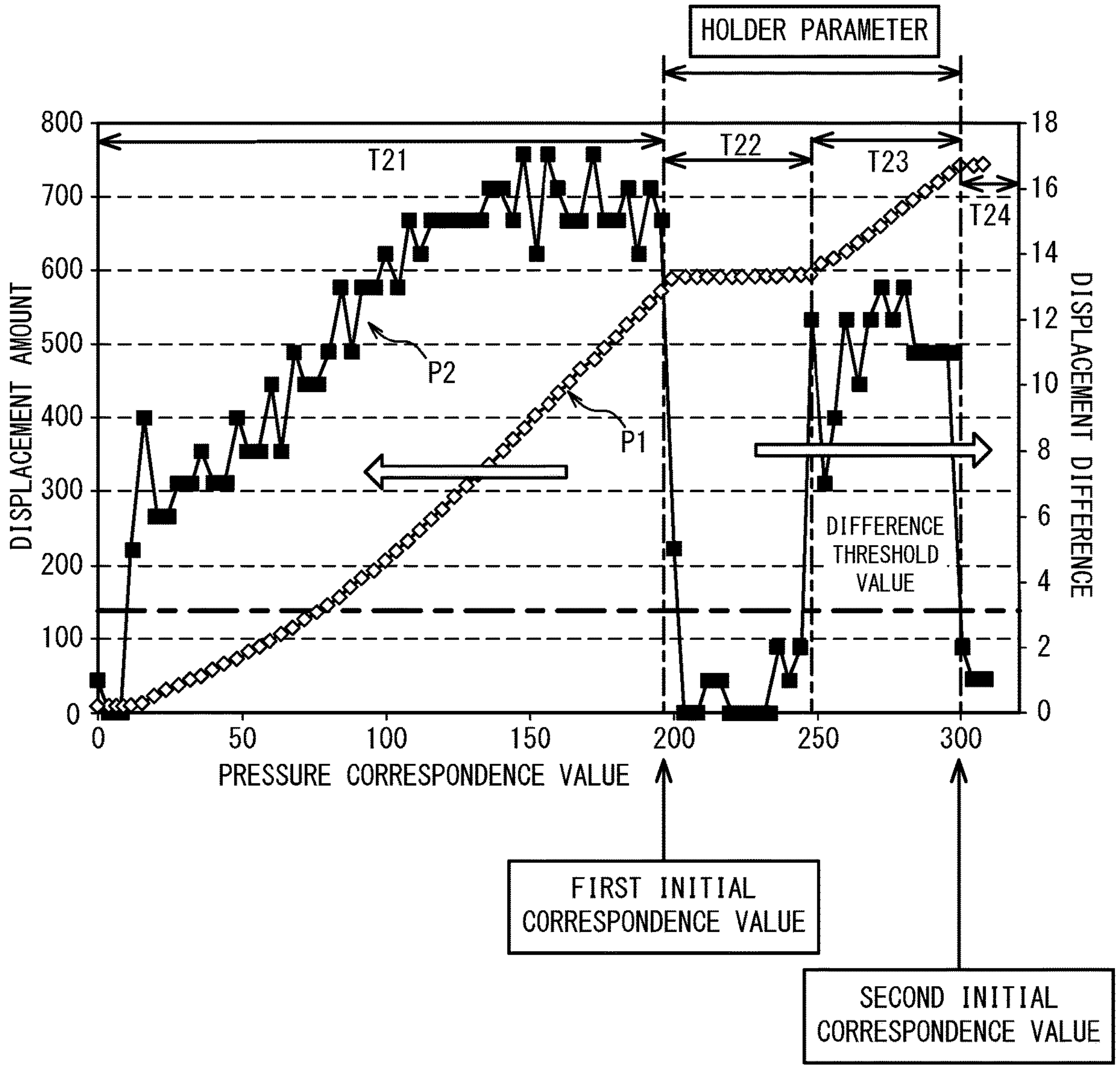
FIG. 10 is a graph showing a relationship between the pressure correspondence value, and the displacement amount and the displacement difference.

During a period from the start of the downward movement of the mounting portion 32 from the reference position to when the holder 42 of the cartridge 4 comes into contact with the second holding portion 102 of the holding member 10 (refer to FIG. 9A and FIG. 9B), the upward pressure is not applied to the mounting portion 32. Thus, as shown by the plot P1 in a region T21 in FIG. 10, the displacement amount becomes larger as the pressure correspondence value increases. Further, as shown by the plot P2 in the region T21, excepting immediately after the start of the movement of the mounting portion 32 (where the pressure correspondence value is from 0 to approximately 30), the displacement difference fluctuates at values larger than the difference threshold value. Note that the region T21 in FIG. 10 corresponds to the region T11 in FIG. 7.

As shown in FIG. 9B, when the holder 42 comes into contact with the second holding portion 102 of the holding member 10, the upward pressure acts on the mounting portion 32 and the downward movement of the mounting portion 32 stops. Thus, as shown by the plot P1 in a region T22 in FIG. 10, even when the pressure correspondence value increases, the displacement amount fluctuates at a constant level (approximately 600 units). Further, as shown by the plot P2 in the region T22, the displacement difference becomes smaller than the difference threshold value. Note that the region T22 in FIG. 10 corresponds to the region T12 in FIG. 7. Further, in the initial setting processing, the holder 42 moves further downward than when the holder 42 is in contact with the object to be cut 20 (refer to FIG. 6B and FIG. 6C). Thus, the values of the displacement amount in the region T22 are larger than the displacement amounts (approximately 450 units) of the region T12 (refer to FIG. 7) when the holder 42 is in contact with the object to be cut 20.

When the pressure correspondence value is equal to or greater than 30 and the displacement difference is continuously smaller than the difference threshold value, the control portion 71 determines that the holder 42 has come into contact with the second holding portion 102 of the holding member 10. The control portion 71 identifies the pressure correspondence value (hereinafter referred to as a first initial correspondence value) when it is determined that the holder 42 has come into contact with the second holding portion 102 of the holding member 10, and stores the identified pressure correspondence value in the RAM 73.

When the downward pressure from the pressure applying mechanism 31 acting on the mounting portion 32 exceeds the upward pressure applied to the mounting portion 32 by the pulses being continuously input to the Z-axis motor 34, the downward movement of the mounting portion 32 restarts (refer to FIG. 9B and FIG. 9C). In this case, as shown by the plot P1 in a region T23 in FIG. 10, the displacement amount becomes larger as the pressure correspondence value increases. Further, as shown by the plot P2 in the region T23, the displacement difference fluctuates at values greater than the difference threshold value. Note that the region T23 in FIG. 10 corresponds to the region T13 in FIG. 7.

As shown in FIG. 9C, when the mounting portion 32 moves further downward and the cutting blade Cs comes into contact with the holding member 10, the downward movement speed of the mounting portion 32 is suppressed compared to before the cutting blade Cs comes into contact with the object to be cut 20 (refer to FIG. 9B). Thus, as shown by the plot P1 in a region T24 in FIG. 10, a rate of increase (a gradient) of the displacement amount is gentler than the rate of increase (the gradient) of the displacement amount in the region T23. Further, as shown by the plot P2 in the region T24, the displacement difference becomes smaller than the difference threshold value.

After the first initial correspondence value has been identified, when the displacement difference has once more become larger than the difference threshold value and next the displacement difference is consecutively smaller than the difference threshold value, the control portion 71 determines that the cutting blade Cs has come into contact with the second holding portion 102 of the holding member 10. The control portion 71 identifies the pressure correspondence value (hereinafter referred to as a second initial correspondence value) when it is determined that the cutting blade Cs has come into contact with the second holding portion 102 of the holding member 10, and stores the identified pressure correspondence value in the RAM 73. The control portion 71 further calculates a difference between the first initial correspondence value and the second initial correspondence value stored in the RAM 73 and stores the difference in the RAM 73 as a holder parameter. The holder parameter corresponds to the number of pulses input to the Z-axis motor 34 during a period from when the holder 42 comes into contact with the second holding portion 102 of the holding member 10 to when the cutting blade Cs comes into contact with the second holding portion 102 of the holding member 10.

The control portion 71 controls the up-down drive mechanism 33 and stops the downward movement of the mounting portion 32. The control portion 71 identifies, on the basis of the cutting data stored in the flash memory 74, start coordinates and end coordinates corresponding to a line segment to be cut first, of the pattern specified by the panel operation. The control portion 71 further identifies a direction (hereinafter referred to as a cutting direction) from the identified start coordinates toward the end coordinates. The control portion 71 controls the conveyance mechanism 7 and the movement mechanism 8, and moves the holding member 10 and the mounting portion 32 relative to each other in the X direction and the Y direction, thus slightly moving the mounting portion 32 in the cutting direction with respect to the holding member 10. In this case, the cutting blade Cs of the cartridge 4 is in contact with the second holding portion 102 of the holding member 10, and thus, an external force acts on the holding member 10 in accordance with the movement of the mounting portion 32. In this way, as shown in FIG. 9D, the cutting blade Cs rotates centering on the rotational axis R, and a blade tip direction of the cutting blade Cs is aligned with the cutting direction. Hereinafter, the above-described processing for aligning the blade tip direction of the cutting blade Cs with the cutting direction is referred to as blade tip alignment processing.

After the blade tip alignment processing is complete, the control portion 71 moves the mounting portion 32 upward toward the reference position. After the mounting portion 32 has moved to the reference position, the control portion 71 controls the up-down drive mechanism 33 and stops the movement of the mounting portion 32. As described above, the initial setting processing (S11, refer to FIG. 8) ends.

Figure 8:
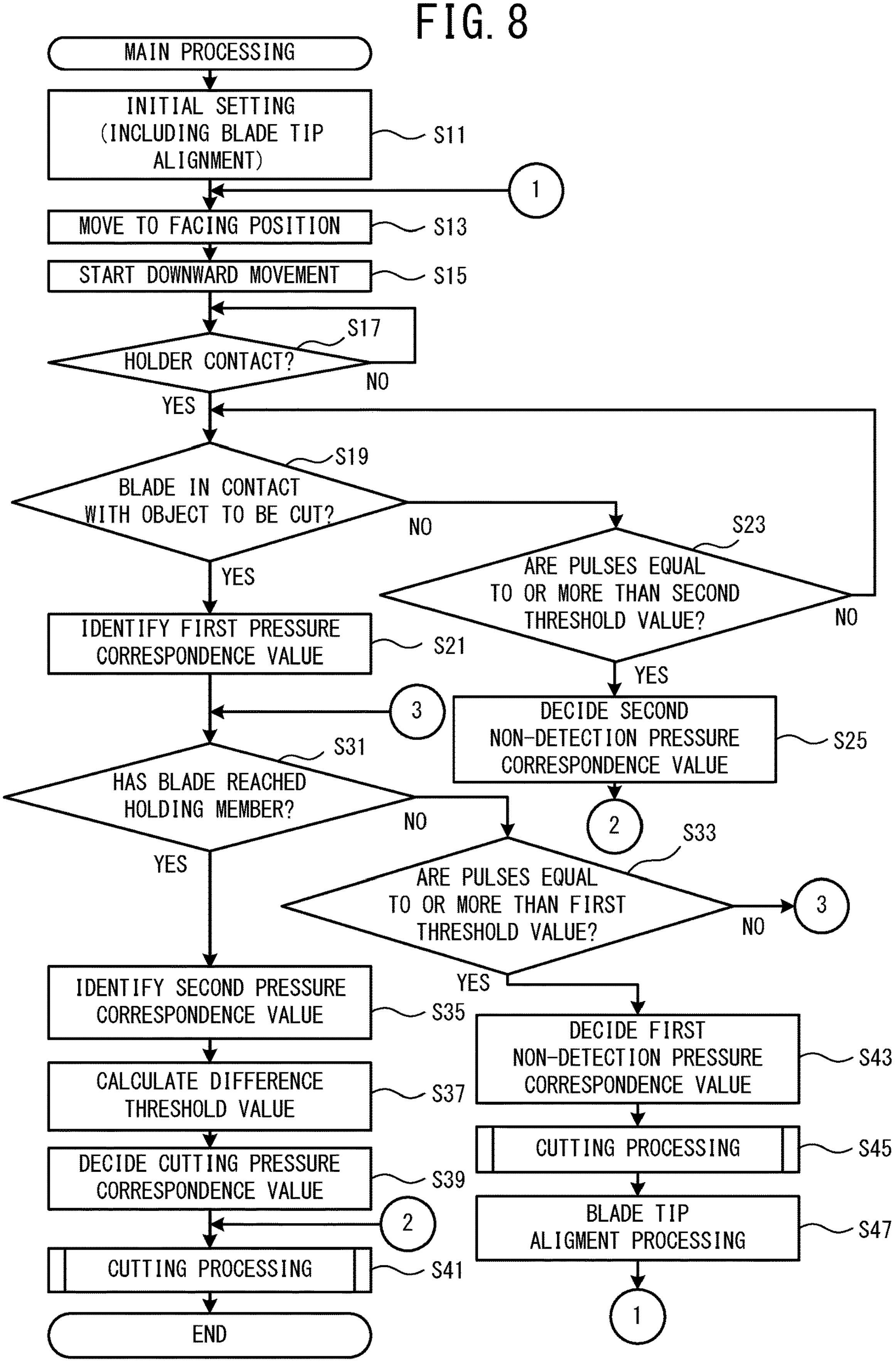
FIG. 8 is a flowchart of main processing.

As shown in FIG. 8, after the initial setting processing is ended, the control portion 71 identifies, on the basis of the cutting data, the start coordinates corresponding to the line segment cut first, of the pattern specified by the panel operation. The control portion 71 controls the conveyance mechanism 7 and the movement mechanism 8, and moves the mounting portion 32 and the holding member 10 relative to each other such that the mounting portion 32 is disposed at a position represented by the start coordinates (S13). Note that, since the object to be cut 20 is held on the holding member 10, the mounting portion 32 after the movement faces the object to be cut 20 in the up-down direction. Further, since the state of the mounting portion 32 being disposed at the reference position in the up-down direction is maintained, the cutting blade Cs mounted to the mounting portion 32 is separated upward from the object to be cut 20 (refer to FIG. 6A). Hereinafter, the position of the mounting portion 32 after the processing at S13 is referred to as a facing position. The control portion 71 controls the up-down drive mechanism 33, and starts to move the mounting portion 32 downward from the facing position (S15).

The control portion 71 determines, on the basis of the displacement difference, whether the holder 42 of the cartridge 4 has come into contact with the object to be cut 20 (S17). Note that, as shown in FIG. 7, during a period from starting the downward movement of the mounting portion 32 from the facing position to when the holder 42 of the cartridge 4 comes into contact with the object to be cut 20 (refer to FIG. 6B), excepting immediately after the start of the movement of the mounting portion 32 (where the pressure correspondence value is from 0 to approximately 30), the displacement difference fluctuates at values larger than the difference threshold value (refer to region T11). Thus, as shown in FIG. 8, when the displacement difference is larger than the difference threshold value, the control portion 71 determines that the holder 42 is not in contact with the object to be cut 20 (no at S17). In this case, the control portion 71 returns the processing to S17, and repeats the determination using the displacement difference. On the other hand, as shown in FIG. 7, when the holder 42 has come into contact with the holding member 10 (refer to FIG. 6B), the upward pressure acts on the mounting portion 32 and the downward movement of the mounting portion 32 stops, and the displacement difference becomes smaller than the difference threshold value (refer to region T12). Thus, as shown in FIG. 8, when the displacement difference has become smaller than the difference threshold value, the control portion 71 determines that the holder 42 has come into contact with the object to be cut 20 (yes at S17). In this case, the control portion 71 advances the processing to S19.

When the pulses are continuously input to the Z-axis motor 34 and the downward pressure from the pressure applying mechanism 31 acting on the mounting portion 32 exceeds the upward pressure, the downward movement of the mounting portion 32 re-starts (refer to FIG. 7, region T13). The control portion 71 determines, on the basis of the displacement difference, whether or not the cutting blade Cs of the cartridge 4 has come into contact with the object to be cut 20 (S19). Note that, as shown in FIG. 7, during the period from the downward movement of the mounting portion 32 to when the cutting blade Cs comes into contact with the object to be cut 20, the displacement difference fluctuates at values larger than the difference threshold value (refer to region T13). When the displacement difference is larger than the difference threshold value, the control portion 71 determines that the cutting blade Cs has not come into contact with the object to be cut 20 (no at S19). In this case, the control portion 71 advances the processing to S23.

The control portion 71 determines whether or not a number of the pulses corresponding to a second threshold value amount, which is obtained by adding a predetermined value (20, for example) to the holder parameter stored in the RAM 73, has been output to the Z-axis motor 34 (S23) from when the holder 42 comes into contact with the object to be cut 20. Note that the number of pulses that is the target of the determination corresponds to driving conditions of the pressure applying mechanism 31, from when it is determined by the processing at S17 that the holder 42 has come into contact with the object to be cut 20. Here, the holder parameter is calculated as the number of pulses input to the Z-axis motor 34 from when the holder 42 comes into contact with the second holding portion 102 of the holding member 10 to when the cutting blade Cs comes into contact with the second holding portion 102 of the holding member 10 in the initial setting processing (S11). When it is determined that the number of pulses corresponding to the second threshold value amount has not been output to the Z-axis motor from when the holder 42 comes into contact with the object to be cut 20 (no at S23), the control portion 71 returns the processing to S19.

As shown in FIG. 7, when the mounting portion 32 moves further downward and the cutting blade Cs comes into contact with the object to be cut 20 (refer to FIG. 6C), the displacement difference is equal to or lower than the difference threshold value (refer to region T14). Thus, as shown in FIG. 8, when both of the displacement differences respectively corresponding to two consecutive pressure correspondence values are equal to or lower than the difference threshold value, the control portion 71 determines that the cutting blade Cs has come into contact with the object to be cut 20 (yes at S19). In this case, the control portion 71 identifies, as a first pressure correspondence value, the pressure correspondence value when the displacement difference smaller than the difference threshold value is calculated (S21), and stores the first pressure correspondence value in the RAM 73. The control portion 71 advances the processing to S31.

On the other hand, in a state in which the contact of the cutting blade Cs with the object to be cut 20 has not been detected, when it is determined that the number of pulses corresponding to the second threshold value amount from when the holder 42 comes into contact with the object to be cut 20 has been input to the Z-axis motor 34 (yes at S23), the control portion 71 advances the processing to S25. In this case, it is assumed that, due to the thickness of the object to be cut 20 being extremely thin, the cutting blade Cs has penetrated the object to be cut 20 immediately after the cutting blade Cs has come into contact with the object to be cut 20 and has reached the holding surface 101A of the holding member 10. In this case, it is assumed that the detection of the contact of the cutting blade Cs with the object to be cut 20 has not been possible, and the control portion 71 decides a second non-detection pressure correspondence value as the cutting pressure correspondence value (S25). The second non-detection pressure correspondence value is decided as a value obtained by adding a predetermined value (1, for example) to the second initial correspondence value (refer to FIG. 10). After deciding the second non-detection pressure correspondence value as the cutting pressure correspondence value, the control portion 71 controls the up-down drive mechanism 33, and stops the downward movement of the mounting portion 32 that was started by the processing at S15. The control portion 71 controls the up-down drive mechanism 33 and moves the mounting portion 32 upward until the mounting portion 32 is disposed at the reference position in the up-down direction. The control portion 71 advances the processing to S41 in order to perform cutting processing (refer to FIG. 12).

After the contact of the cutting blade Cs with the object to be cut 20 has been detected (yes at S19), and the first pressure correspondence value has been acquired (S21), the control portion 71 determines, on the basis of the displacement difference, whether or not the cutting blade Cs of the cartridge 4 has passed through the object to be cut 20 and has reached the holding surface 101A of the holding member 10 (S31). Note that, as shown in FIG. 7, when the cutting blade Cs has reached the holding surface 101A of the holding member 10 (refer to FIG. 6E), the displacement difference becomes larger than the difference threshold value (refer to region T15). Thus, after acquiring the first pressure correspondence value, when one of the following conditions (1) to (3) is satisfied, the control portion 71 determines that the cutting blade Cs has reached the holding surface 101A of the holding member 10 (yes at S31).

(1) When both of the displacement differences respectively corresponding to two of the consecutive pressure correspondence values are larger than the difference threshold value, (2) When the displacement difference larger than the difference threshold value has been detected a total of three times, and (3) When the displacement difference has become equal to or greater than 16 units.

When it is determined that the cutting blade Cs has reached the holding surface 101A of the holding member 10, the control portion 71 determines, as a second pressure correspondence value, the pressure correspondence value when one of the conditions (1) to (3) is satisfied (S35), and stores the second pressure correspondence value in the RAM 73.

The control portion 71 acquires the first pressure correspondence value and the second pressure correspondence value stored in the RAM 73. The control portion 71 calculates, as a difference correspondence value, a difference between the first pressure correspondence value and the second pressure correspondence value (S37). The control portion 71 decides the cutting pressure correspondence value on the basis of the calculated difference correspondence value (S39).

Figure 11:
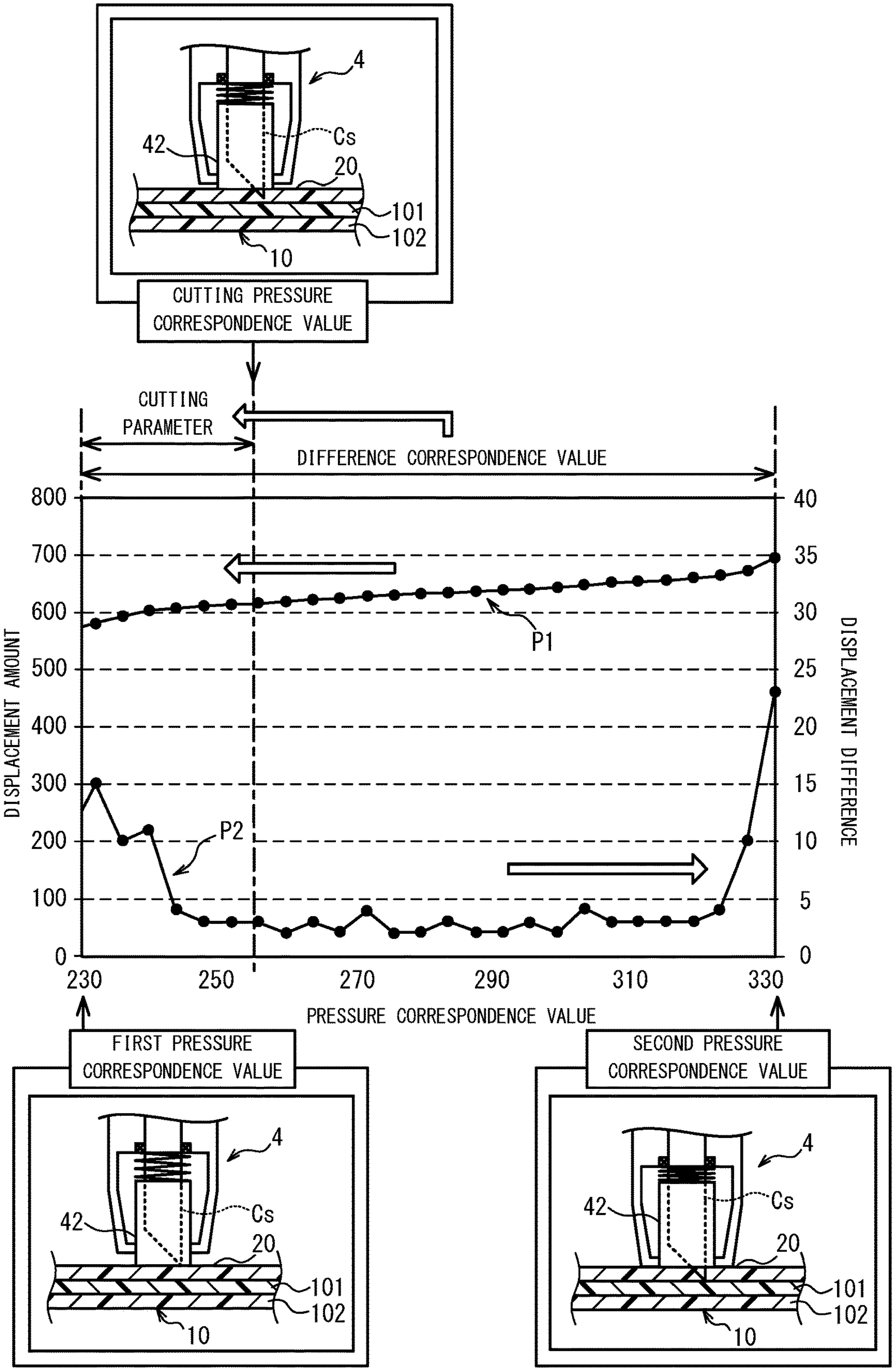
FIG. 11 is an enlarged view in which a section indicated by dotted lines in FIG. 7 is enlarged.

Specifically, as shown in FIG. 11, the control portion 71 applies a predetermined function, which is prescribed in advance, to the difference correspondence value calculated by the processing at S37 and calculates a cutting parameter. The control portion 71 decides the cutting pressure correspondence value by adding the derived cutting parameter to the first pressure correspondence value stored in the RAM 73. In this case, the cutting pressure correspondence value is a value that is smaller than the second pressure correspondence value and larger than the first pressure correspondence value. Thus, the pressure applied to the mounting portion 32 when the pressure applying mechanism 31 is driven on the basis of the cutting pressure correspondence value is smaller than the pressure applied to the mounting portion 32 when the pressure applying mechanism 31 is driven on the basis of the second pressure correspondence value, and is larger than the pressure applied to the mounting portion 32 when the pressure applying mechanism 31 is driven on the basis of the first pressure correspondence value.

As shown in FIG. 8, after deciding the cutting pressure correspondence value, the control portion 71 controls the up-down drive mechanism 33, and stops the downward movement of the mounting portion 32 started by the processing at S15. The control portion 71 controls the up-down drive mechanism 33, and moves the mounting portion 32 upward until the mounting portion 32 is disposed at the reference position in the up-down direction. In order to perform a cutting operation to cut the object to be cut 20 by applying pressure, using the pressure applying mechanism 31, on the basis of the decided cutting pressure correspondence value, the control portion 71 performs the cutting processing (refer to FIG. 12) (S41). The cutting processing will be described in detail later. The control portion 71 ends the main processing after the cutting processing.

On the other hand, when, in the processing at S31, one of the conditions (1) to (3) is not satisfied (no at S31), the control portion 71 acquires the number of the pulses input to the Z-axis motor 34 after it is determined, by the processing at S19, that the cutting blade Cs has come into contact with the object to be cut 20. Note that, the acquired number of pulses corresponds to the driving conditions of the pressure applying mechanism 31 from when it is determined, by the processing at S19, that the cutting blade Cs has come into contact with the object to be cut 20. The control portion 71 determines whether the acquired number of pulses is equal to or greater than a first threshold value (S33). When it is determined that the acquired number of pulses is smaller than the first threshold value (no at S33), the control portion 71 returns the processing to S31, and repeats the determination as to whether the cutting blade Cs has come into contact with the holding member 10. For example, when the hardness of the object to be cut 20 is hard, even when the pressure applied to the mounting portion 32 by the pressure applying mechanism 31 is increased, there is a possibility that the cutting blade Cs does not penetrate the object to be cut 20. In this case, the cutting blade Cs does not reach the holding surface 101A of the holding member 10. When it is determined that the acquired number of pulses is equal to or greater than the first threshold value (yes at S33), it is assumed that it is not possible to detect the cutting blade Cs reaching the holding surface 101A of the holding member 10, and the control portion 71 advances the processing to S43.

The control portion 71 decides a predetermined first non-detection pressure correspondence value as the cutting pressure correspondence value (S43). The first non-detection pressure correspondence value is, for example, a value obtained by adding a predetermined value to the first pressure correspondence value. After deciding the first non-detection pressure correspondence value as the cutting pressure correspondence value, the control portion 71 controls the up-down drive mechanism 33, and stops the downward movement of the mounting portion 32 started by the processing at S15. The control portion 71 controls the up-down drive mechanism 33, and moves the mounting portion 32 upward until the mounting portion 32 is disposed at the reference position in the up-down direction.

In order to perform the cutting operation by applying the pressure, using the pressure applying mechanism 31, on the basis of the decided cutting pressure correspondence value, the control portion 71 performs the cutting processing (refer to FIG. 12) (S45). The cutting processing will be described in detail later. After ending the cutting processing (S45), the control portion 71 moves the mounting portion 32 and the holding member 10 relative to each other such that the mounting portion 32 is disposed above the adjustment region 10T (refer to FIG. 1) of the second holding portion 102. The control portion 71 performs the blade tip alignment processing (S47), and returns the processing to S13. In this case, in the processing that is repeated thereafter (S13 onward), cutting processing is performed (S41 or S45) repeatedly. At this time, the cutting blade Cs repeatedly cuts the pattern, of the object to be cut 20, that has been cut by the cutting processing (S45) the first time. It is thus possible to appropriately perform the cutting processing, even when the hardness of the object to be cut 20 is hard.

Cutting Processing

The cutting processing will be explained with reference to FIG. 12. The control portion 71 reads out and acquires, from the flash memory 74, the cutting data for cutting the pattern selected by the panel operation from the object to be cut 20 (S61). Hereinafter, an example will be specifically explained in which the cutting data for cutting the pattern M shown in FIG. 13 is acquired. The pattern M has a square shape, and includes a first line segment L1, a second line segment L2, a third line segment L3, and a fourth line segment L4. The first line segment L1 and the third line segment L3 face each other in the front-rear direction and each extends in the left-right direction. The first line segment L1 is disposed to the front of the third line segment L3. The first line segment L1 includes a first partial line segment L11 further to the left than a center in the left-right direction, and a first partial line segment L12 further to the right than the center in the left-right direction. The second line segment L2 and the fourth line segment L4 face each other in the left-right direction and each extends in the front-rear direction. The second line segment L2 is disposed to the left of the fourth line segment L4. The second line segment L2 extends between the left end portions of each of the first line segment L1 and the third line segment L3. The fourth line segment L4 extends between the right end portions of each of the first line segment L1 and the third line segment L3.

As shown in FIG. 14, the cutting data includes, as the start coordinates and the end coordinates, respective coordinates of positions Q1, Q2, Q3, and Q4 that are the respective corner portions of the pattern M, and a position Q0 of the center, in the left-right direction, of the first line segment L1. The coordinates of the position Q0 are associated with the first partial line segment L11 as the start coordinates, and the coordinates of the position Q1 are associated with the first line segment L1 as the end coordinates. The coordinates of the position Q1 are associated with the second line segment L2 as the start coordinates, and the coordinates of the position Q2 are associated with the second line segment L2 as the end coordinates. The coordinates of the position Q2 are associated with the third line segment L3 as the start coordinates, and the coordinates of the position Q3 are associated with the third line segment L3 as the end coordinates. The coordinates of the position Q3 are associated with the fourth line segment L4 as the start coordinates, and the coordinates of the position Q4 are associated with the fourth line segment L4 as the end coordinates. The coordinates of the position Q4 are associated with the first partial line segment L12 as the start coordinates, and the coordinates of the position Q0 are associated with the first partial line segment L12 as the end coordinates. By performing the cutting in the order of the first partial line segment L11, the second line segment L2, the third line segment L3, the fourth line segment L4, and the first partial line segment L12, the pattern M is cut from the object to be cut 20.

Note that, by performing the processing at S13, the control portion 71 moves the mounting portion 32 and the holding member 10 relative to each other such that the mounting portion 32 is disposed at the position represented by the start coordinates of the first partial line segment L11. Further, in this case, in order to decide the cutting pressure correspondence value by the processing at S25, S39, and S43 (refer to FIG. 8), the control portion 71 moves the mounting portion 32 downward by the processing at S15 (refer to FIG. 8). In this way, a cut by the cutting blade Cs is already formed at the position Q0 represented by the start coordinates of the first partial line segment L11, of the object to be cut 20 and the holding member 10. This cut penetrates the object to be cut 20 in the up-down direction. Further, when the cutting processing is performed a plurality of times in order to repeatedly cut the pattern, the cut is already formed by the cutting processing of the previous time, at the position Q0 represented by the start coordinates of the first partial line segment L11, of the object to be cut 20 and the holding member 10.

Figure 12:
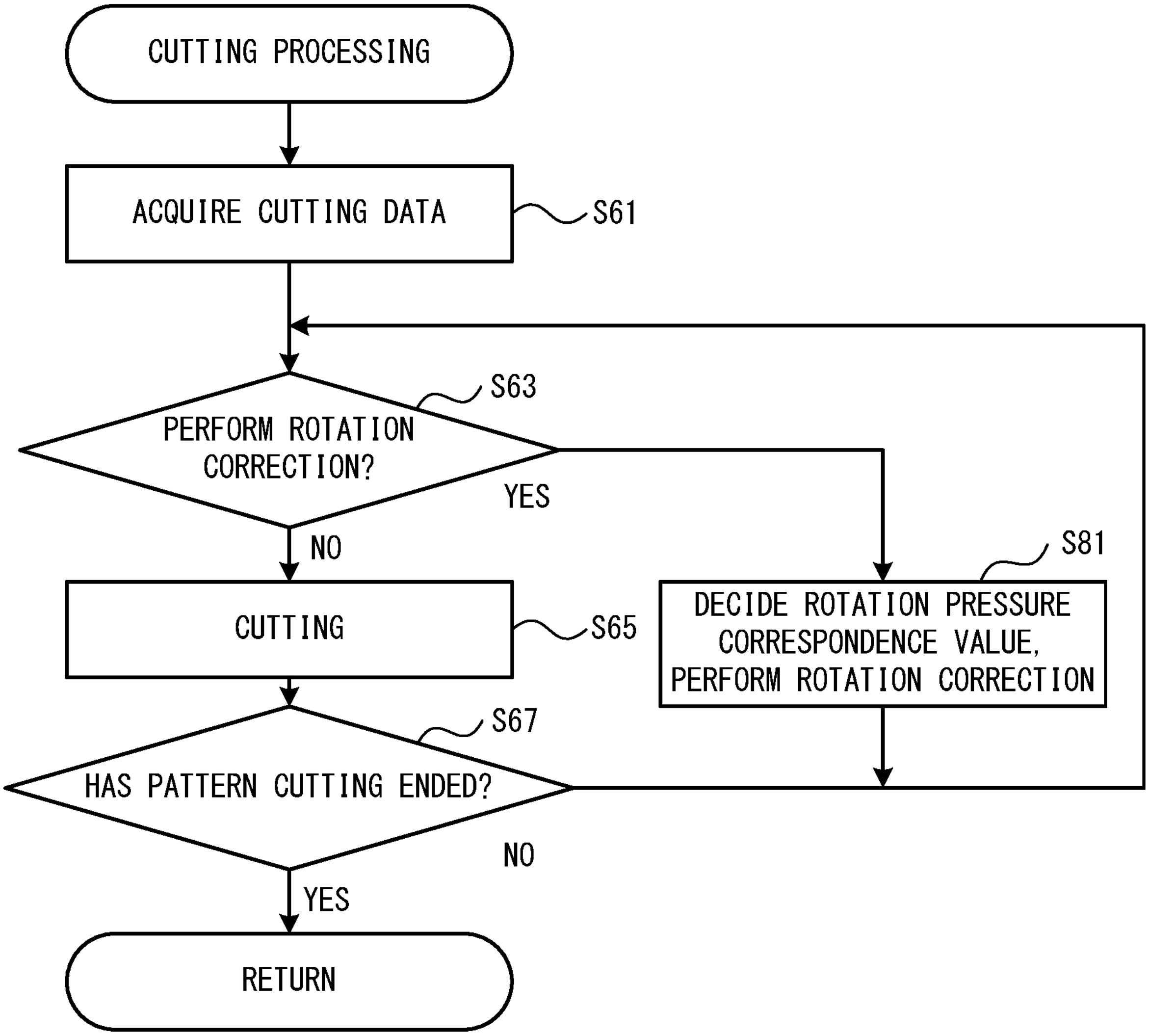
FIG. 12 is a flowchart of cutting processing.
Figure 13:
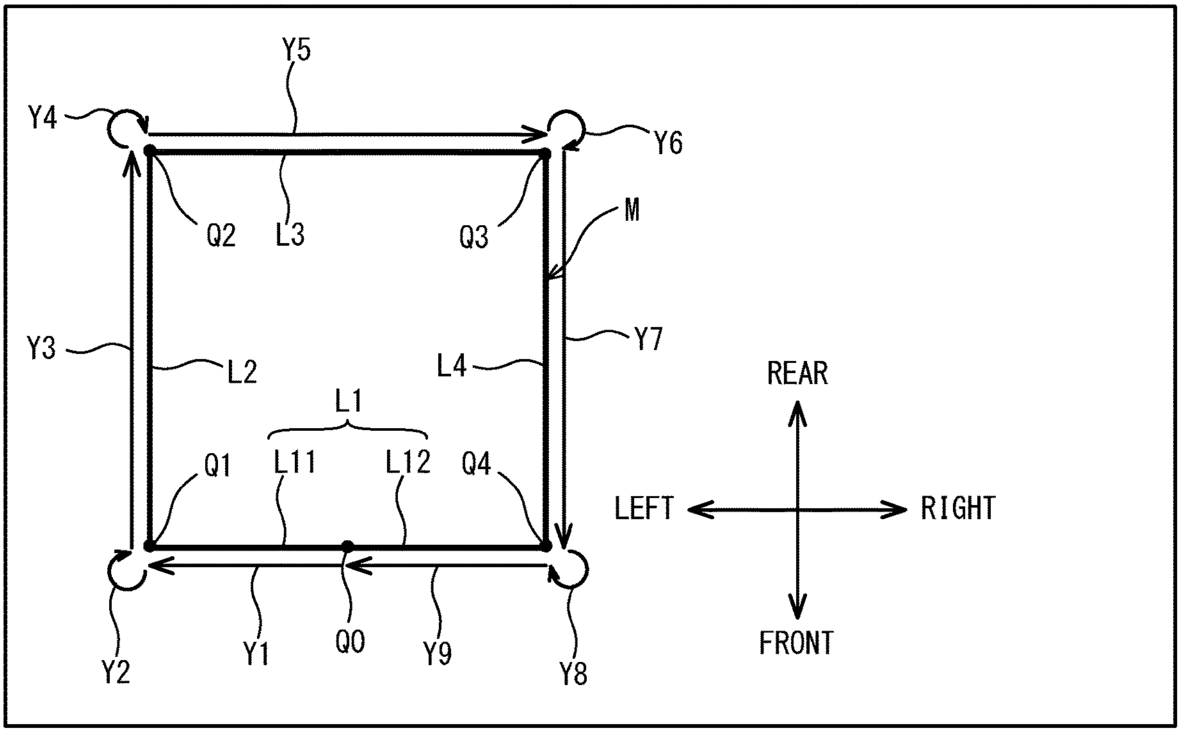
FIG. 13 is an explanatory diagram describing a state of cutting a pattern M by the cutting processing.

As shown in FIG. 12, the control portion 71 selects the start coordinates and the end coordinates from the cutting data for each of the line segments in accordance with a cutting order. First, the start coordinates and the end coordinates of the first partial line segment L11 are selected. The control portion 71 determines whether or not to perform rotation correction (S63). When the start coordinates and the end coordinates of the first partial line segment L11 that is to be cut first have been selected, the control portion 71 determines that there is no need to perform the rotation correction (no at S63). The control portion 71 cuts the first partial line segment L11 by performing the following processing (S65).

The control portion 71 controls the up-down drive mechanism 33 by outputting, to the Z-axis motor 34, a number of pulses corresponding to the cutting pressure correspondence value decided by one of the processing at S25, at S39, or at S43 (refer to FIG. 8). In this way, the pressure is applied to the mounting portion 32 by the pressure applying mechanism 31 on the basis of the cutting pressure correspondence value, and the mounting portion 32 moves downward from the reference position. Note that, as described above, the cut by the cutting blade Cs is already formed at the position Q0 represented by the start coordinates of the first partial line segment L11. Thus, as shown in FIG. 15, the blade tip of the cutting blade Cs is disposed at a first position D1 that is below the lower surface (the holding surface 101A) of the object to be cut 20, and is higher than the lower surface of the first holding portion 101 of the holding member 10 (an arrow Y0).

Next, by controlling the conveyance mechanism 7 and the movement mechanism 8, the control portion 71 moves the holding member 10 and the mounting portion 32 relative to each other such that the mounting portion 32 is disposed at the position Q1 represented by the end coordinates of the cutting data (an arrow Y1). In other words, in a state in which the pressure is applied to the mounting portion 32 by the pressure applying mechanism 31 on the basis of the cutting pressure correspondence value, the cutting blade Cs moves relatively in the X direction and the Y direction. In this way, the first partial line segment L11 is cut from the position Q0 toward the position Q1. Note that the upward pressure acting on the mounting portion 32, when the cutting blade Cs moves relatively in the X direction and the Y direction in the state in which the cutting blade Cs has penetrated into the object to be cut 20 and the holding member 10, is smaller than the upward pressure acting on the mounting portion 32, when the cutting blade Cs moves downward and penetrates into the object to be cut 20 and the holding member. Thus, when the cutting blade Cs moves relatively in the X direction and the Y direction, the blade tip of the cutting blade Cs is disposed in a first position D1' that is slightly lower than the first position D1 in the up-down direction. Next, by controlling the up-down drive mechanism 33, the control portion 71 moves the mounting portion 32 upward until the mounting portion 32 is disposed in at a second position D2 at which the blade tip of the cutting blade Cs is above the upper surface of the object to be cut 20 and is lower than the reference position (an arrow Y11).

As shown in FIG. 12, the control portion 71 determines whether the cutting of the pattern M has ended (S67). When the line segment for which the cutting is not complete is remaining, the control portion 71 determines that the cutting of the pattern M has not ended (no at S67). In this case, the control portion 71 returns the processing to S63. The control portion 71 selects the start coordinates and the end coordinates of the second line segment L2 to be cut next. The control portion 71 determines whether or not to perform the rotation correction (S63). When a cutting direction of the first partial line segment L11 previously cut and the cutting direction of the second line segment L2 to be cut next are different, the control portion 71 determines that it is necessary to perform the rotation correction (yes at S63). In this case, as a result of the control portion 71 performing the following processing, a rotation pressure correspondence value is decided, and the rotation correction is performed (S81).

Figure 15:
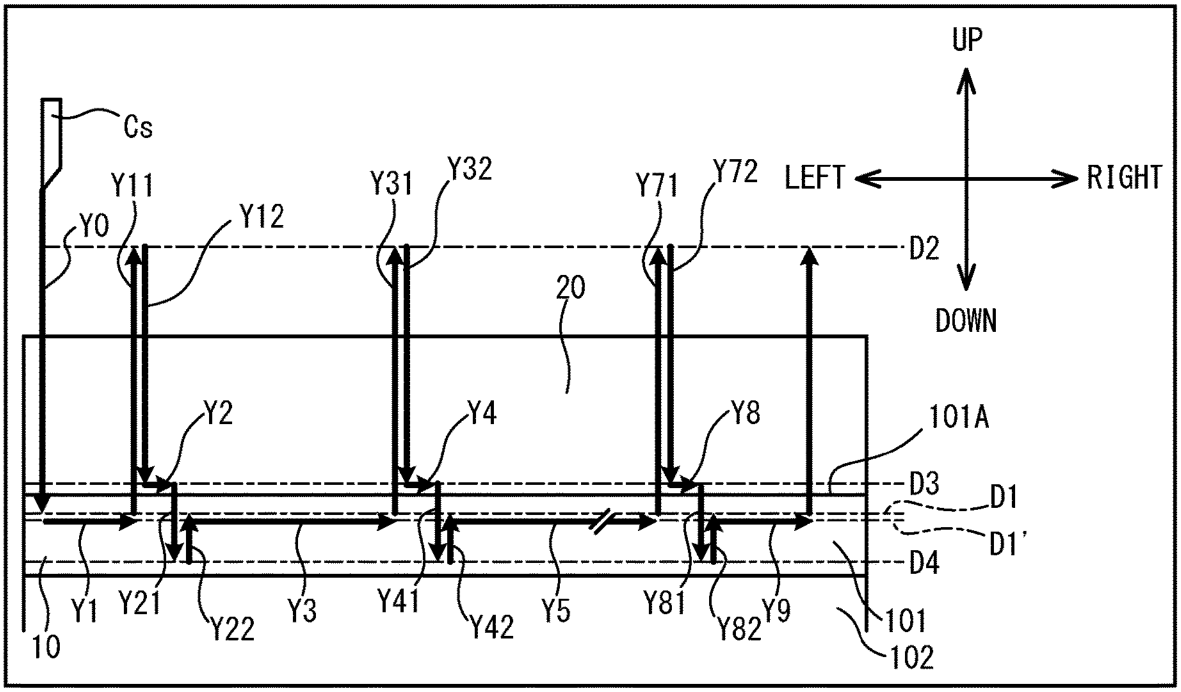
FIG. 15 is an explanatory diagram describing a state of cutting the pattern M by the cutting processing.

As shown in FIG. 15, the control portion 71 controls the up-down drive mechanism 33 by outputting, to the Z-axis motor 34, a number of pulses corresponding to a value smaller than the cutting pressure correspondence value. In this way, the pressure is applied to the mounting portion 32 by the pressure applying mechanism 31 on the basis of the value that is smaller than the cutting pressure correspondence value, and the mounting portion 32 moves downward from the second position D2. As a result, the blade tip of the cutting blade Cs is disposed at a third position D3 that is below the upper surface of the object to be cut 20 and is above the first positions D1 and D1' (an arrow Y12). In this case, the pressure correspondence value corresponding to the pressure applied to the mounting portion 32 from the pressure applying mechanism 31 is referred to as a rotation pressure correspondence value.

The rotation pressure correspondence value is the number of pulses output to the Z-axis motor 34 as described above. The rotation pressure correspondence value is any value between the first pressure correspondence value and the second pressure correspondence value, and is a value that is smaller than the cutting pressure correspondence value. The control portion 71 applies a predetermined function that is prescribed in advance, to the difference between the first pressure correspondence value and the second pressure correspondence value (the difference correspondence value), and calculates a rotation parameter. The control portion 71 decides the rotation pressure correspondence value by adding the derived rotation parameter to the first pressure correspondence value stored in the RAM 73. In this case, the rotation pressure correspondence value is a value that is larger the larger the cutting pressure correspondence value becomes. In other words, the rotation pressure correspondence value increases proportionally with an increase in the cutting pressure correspondence value.

Next, the control portion 71 controls the conveyance mechanism 7 and the movement mechanism 8, and moves the holding member 10 and the mounting portion 32 relative to each other such that a relative movement direction of the cutting blade Cs with respect to the object to be cut 20 gradually changes from the cutting direction from the start coordinates to the end coordinates of the first partial line segment L11 (hereinafter referred to as a first cutting direction) to the cutting direction from the start coordinates to the end coordinates of the second line segment L2 (hereinafter referred to as a second cutting direction). At this time, the cutting blade Cs moves relatively in the X direction and the Y direction in a state in which the pressure is applied to the mounting portion 32 by the pressure applying mechanism 31 on the basis of the rotation pressure correspondence value. In other words, the cutting blade Cs relatively moves in the X direction and the Y direction in the state in which the pressure is applied to the mounting portion 32 that is smaller than the pressure applied to the mounting portion 32 by the pressure applying mechanism 31 on the basis of the cutting pressure correspondence value. Note that the cutting blade Cs is in contact with the object to be cut 20 and the first holding portion 101 of the holding member 10, and thus, an external force acts on the cutting blade Cs from the object to be cut 20 in accordance with the relative movement of the mounting portion 32 with respect to the object to be cut 20. In this way, the cutting blade Cs rotates around the rotational axis R (refer to FIG. 5), and the blade tip direction of the cutting blade Cs is changed from the first cutting direction to the second cutting direction (an arrow Y2).

Next, the control portion 71 controls the up-down drive mechanism 33 by outputting, to the Z-axis motor 34, a number of pulses corresponding to a value larger than the cutting pressure correspondence value. In this way, the pressure is applied to the mounting portion 32 from the pressure applying mechanism 31 on the basis of the value that is larger than the cutting pressure correspondence value, and the mounting portion 32 moves downward from the third position D3. As a result, the blade tip of the cutting blade Cs is disposed at a fourth position D4 that is lower than the first positions D1 and D1' and higher than the lower surface of the first holding portion 101 of the holding member 10 (an arrow Y21). Next, the control portion 71 controls the up-down drive mechanism 33 by outputting, to the Z-axis motor 34, the number of pulses corresponding to the cutting pressure correspondence value. In this way, the pressure is applied to the mounting portion 32 by the pressure applying mechanism 31 on the basis of the cutting pressure correspondence value, and the mounting portion 32 moves upward from the fourth position D4. As a result, the blade tip of the cutting blade Cs is disposed at the first position D1 (an arrow Y22). As described above, the rotation correction is complete. As shown in FIG. 12, after the rotation correction (S81) is complete, the control portion 71 returns the processing to S63.

As shown in FIG. 12, after the rotation correction (S81) is complete, the control portion 71 determines whether or not to perform the rotation correction (S63). Immediately after the rotation correction has been performed, the control portion 71 determines that it is not necessary to perform the rotation correction (no at S63). In this case, the control portion 71 cuts the second line segment L2 (S65) (refer to an arrow Y3 in FIG. 13). The method for cutting the second line segment L2 is the same as the method for cutting the first partial line segment L11, and an explanation thereof is thus omitted here.

By repeating the above-described processing, the rotation correction (arrows Y31, Y32, Y4, Y41, and Y42), cutting of the third line segment L3 (an arrow Y5), the rotation correction (an arrow Y6), cutting of the fourth line segment L4 (an arrow Y7), the rotation correction (arrows Y71, Y72, Y8, Y81, and Y82), and cutting of the first partial line segment L12 (an arrow Y9) are sequentially performed.

When the cutting of the first partial line segment L12 has ended, the control portion 71 determines that the cutting of the pattern M has ended (yes at S67). In this case, the control portion 71 ends the cutting processing, and returns the processing to the main processing (refer to FIG. 8).

Actions and Effects of Present Embodiment

The cutting device 1 decides the cutting pressure correspondence value when cutting the pattern M from the object to be cut 20 (S39), on the basis of the first pressure correspondence value (S21) when the cutting blade Cs has come into contact with the object to be cut 20 (yes at S19), and the second pressure correspondence value (S35) when the cutting blade Cs has reached the holding surface 101A of the holding member 10 (yes at S31). Here, for example, if the cutting operation is not performed in a state in which the blade tip of the cutting blade Cs has reached the holding surface 101A, this means that the cutting operation is performed in a state in which a degree of penetration with respect to the object to be cut 20 is small, and it is possible that the cutting of the object to be cut 20 will be insufficient. On the other hand, when the cutting operation is performed in a state in which the blade tip of the cutting blade Cs has penetrated deeply into the first holding portion 101 of the holding member 10, this is not favorable, as there is a possibility that the soft first holding portion 101 may become entangled with the cutting blade Cs and obstruct the movement of the cutting blade Cs. In contrast to this, on the basis of the first pressure correspondence value and the second pressure correspondence value, the cutting device 1 can appropriately decide the cutting pressure correspondence value at the time of the cutting using the cutting blade Cs. Thus, the cutting device 1 can apply the pressure to the cutting blade Cs under conditions suited to the object to be cut 20, and can cut the object to be cut 20.

The cutting device 1 decides the cutting pressure correspondence value on the basis of the difference correspondence value, which is the difference between the first pressure correspondence value and the second pressure correspondence value (S39). Note that, since the difference correspondence value corresponds to the number of pulses input to the Z-axis motor 34 from when the cutting blade Cs comes into contact with the object to be cut 20 to when the cutting blade Cs reaches the holding surface 101A of the holding member 10, the difference correspondence value indicates the hardness of the object to be cut 20. Thus, on the basis of the difference correspondence value, the cutting device 1 can decide the cutting pressure correspondence value that takes into account the hardness of the object to be cut 20. As a result, the cutting device 1 can accurately decide the conditions for the cutting blade Cs when cutting the object to be cut 20.

The decided cutting pressure correspondence value is larger than the first pressure correspondence value and smaller than the second pressure correspondence value. Thus, the pressure applied to the mounting portion 32 by the pressure applying mechanism 31 on the basis of the cutting pressure correspondence value is larger than the pressure corresponding to the pressure applied to the mounting portion 32 by the pressure applying mechanism 31 on the basis of the first pressure correspondence value, and is smaller than the pressure applied to the mounting portion 32 by the pressure applying mechanism 31 on the basis of the second pressure correspondence value. In this case, in the cutting of the object to be cut 20, the blade tip of the cutting blade Cs penetrates the object to be cut 20 and is disposed to be lower than the upper surface of the first holding portion 101 (the holding surface 101A) of the holding member 10. Thus, the cutting device 1 can appropriately cut the object to be cut 20 using the cutting blade Cs. In this way, the cutting device 1 can decide the appropriate cutting pressure correspondence value in accordance with the hardness of the object to be cut 20, and can cut the object to be cut 20.

When both the displacement differences respectively corresponding to the two consecutive pressure correspondence values are equal to or lower than the difference threshold value, the cutting device 1 determines that the cutting blade Cs has come into contact with the object to be cut 20 (yes at S19), and identifies the first pressure correspondence value (S21). In this way, the cutting device 1 can accurately identify the first pressure correspondence value when the cutting blade Cs has come into contact with the object to be cut 20.

When the displacement difference satisfies any one of the conditions (1) to (3), the cutting device 1 determines that the cutting blade Cs has reached the holding surface 101A of the holding member 10 (yes at S31), and identifies the second pressure correspondence value (S35). Note that the conditions (1) and (2) correspond to a case in which the displacement difference has become larger than the difference threshold value. In this way, the cutting device 1 can accurately identify the second pressure correspondence value when the cutting blade Cs has reached the holding surface 101A of the holding member 10.

When the number of pulses input to the Z-axis motor 34 after the cutting blade Cs has come into contact with the object to be cut 20 is equal to greater than the first threshold value (yes at S33), the cutting device 1 determines that the reaching of the cutting blade Cs to the holding surface 101A of the holding member 10 cannot be detected, and decides the first non-detection pressure correspondence value as the cutting pressure correspondence value (S43). As a specific example of this kind of case, a case may be given in which, due to the fact that the hardness of the object to be cut 20 is hard, it is not possible to detect that the cutting blade Cs has reached the holding surface 101A of the holding member 10. Thus, the cutting device 1 cuts the object to be cut 20 a plurality of times using the cutting blade Cs (S45). In this way, the cutting device 1 can appropriately cut the object to be cut 20 even when the hardness of the object to be cut 20 is hard.

When the number of pulses input to the Z-axis motor 34 after the holder 42 has come into contact with the object to be cut 20 is equal to or greater than the second threshold value (yes at S23), the cutting device 1 determines that the contact by the cutting blade Cs with the object to be cut 20 cannot be detected, and decides the second non-detection pressure correspondence value as the cutting pressure correspondence value (S25). In this case, even when it is not possible to detect that the cutting blade Cs has penetrated the object to be cut 20 and has come into contact with the first holding portion 101 of the holding member 10, due to the thickness of the object to be cut 20 being thin, for example, the cutting device 1 can appropriately cut the object to be cut 20 using the cutting blade Cs.

After the cutting of the first partial line segment L11, the cutting device 1 controls the conveyance mechanism 7 and the movement mechanism 8, and moves the holding member 10 and the mounting portion 32 relative to each other in the X direction and the Y direction, such that the relative movement direction of the cutting blade Cs with respect to the object to be cut 20 gradually changes from the cutting direction of the first partial line segment L11 (the first cutting direction) to the cutting direction of the second line segment L2 (the second cutting direction). At this time, the pressure correspondence value corresponding to the pressure applied to the mounting portion 32 by the pressure applying mechanism 31 is the rotation pressure correspondence value that is smaller than the cutting pressure correspondence value. In this way, after cutting the first partial line segment L11, when cutting the second line segment L2 having the different cutting direction, the cutting device 1 can suppress the cutting blade Cs from biting into the holding member 10 and obstructing the change in the blade tip direction. Thus, the cutting device 1 can smoothly perform the change of the blade tip direction of the cutting blade Cs. Further, after changing the blade tip direction of the cutting blade Cs, the cutting device 1 applies the pressure to the mounting portion 32 by the pressure applying mechanism 31 on the basis of the cutting pressure correspondence value, and cuts the second line segment L2. In this case, the cutting device 1 can appropriately cut the second line segment L2 using the cutting blade Cs whose blade tip direction has been changed.

The cutting device 1 ends the cutting of the first partial line segment L11, and, after changing the blade tip direction of the cutting blade Cs, applies the pressure to the mounting portion 32, using the pressure applying mechanism 31, on the basis of the value that is larger than the cutting pressure correspondence value and moves the mounting portion 32 downward. In this way, a deeper cut is formed in the object to be cut 20 and the holding member 10 than at the time of cutting the first partial line segment L11. After that, the cutting device 1 applies the pressure to the mounting portion 32, using the pressure applying mechanism 31, on the basis of the cutting pressure correspondence value, and moves the mounting portion 32 upward. The cutting device 1 cuts the second line segment L2 in this state. Note that, when starting the cutting of the line segment, a larger load is placed on the cutting blade Cs, and thus, there is a possibility that the object to be cut 20 cannot be cut appropriately. In contrast to this, since the cutting device 1 can cause the deep cut to be formed in the object to be cut 20 and the holding member 10 before the start of the cutting, the cutting device 1 can appropriately cut the second line segment L2 from immediately after the start of the cutting.

On the basis of the difference (the difference correspondence value) between the first pressure correspondence value and the second pressure correspondence value, the cutting device 1 decides the rotation pressure correspondence value that is smaller than the cutting pressure correspondence value. In this case, the cutting device 1 can easily decide the pressure correspondence value for suppressing the cutting blade Cs from biting into the holding member 10 when changing the blade tip direction of the cutting blade Cs. Thus, the cutting device 1 can smoothly change the blade tip direction of the cutting blade Cs. Further, the cutting device 1 can decide the rotation pressure correspondence value that has the larger value the larger the cutting pressure correspondence value. In this case, the pressure correspondence value when changing the blade tip direction of the cutting blade Cs can be adjusted in accordance with the cutting conditions of the line segment. Thus, the cutting device 1 can decide the appropriate rotation pressure correspondence value that accords with the pressure correspondence value when cutting the line segment, and can appropriately change the blade tip direction of the cutting blade Cs.

Modified Examples

The present disclosure is not limited to the above-described embodiment and various modifications are possible. The cartridge 4 need not necessarily be provided with the holder 42, and the cutting blade Cs may be constantly exposed. The method for detecting that the cutting blade Cs has come into contact with the object to be cut 20, and the method for detecting that the cutting blade Cs has reached the holding surface 101A of the holding member 10 are not limited to the above-described methods. For example, the cutting device 1 may detect that the cutting blade Cs has come into contact with the object to be cut 20, and detect that the cutting blade Cs has reached the holding surface 101A of the holding member 10, on the basis of the displacement amount, instead of the displacement difference. More specifically, for example, the cutting device 1 may detect that the cutting blade Cs has come into contact with the object to be cut 20 and detect that the cutting blade Cs has reached the holding surface 101A of the holding member 10 by identifying a switch in a change amount (the gradient) of the displacement amount. The cutting device 1 may be provided with a contact sensor that can detect that the cutting blade Cs has come into contact with the object to be cut 20. The control portion 71 may determine whether or not the cutting blade Cs has come into contact with the object to be cut 20 on the basis of a detection result by the contact sensor.

The method when deciding the cutting pressure correspondence value on the basis of the difference correspondence value, which is the difference between the first pressure correspondence value and the second pressure correspondence value, is not limited to the above-described method. For example, the cutting device 1 may decide the cutting pressure correspondence value by adding the cutting parameter to a reference correspondence value that is obtained by adding a predetermined value to the first pressure correspondence value. The cutting device 1 may store, in the ROM 72 in advance, a table storing cutting pressure correspondence values corresponding to the first pressure correspondence value and the second pressure correspondence value. The cutting device 1 may decide the cutting pressure correspondence value corresponding to the first pressure correspondence value and the second pressure correspondence value by referring to the table. Further, for example, the cutting device 1 may decide, as the cutting pressure correspondence value, an average value of the first pressure correspondence value and the second pressure correspondence value. In this case, the difference correspondence value need not necessarily be used when deciding the cutting pressure correspondence value.

The method for deciding the cutting parameter is not limited to the method described above. For example, the cutting device 1 may store, in the ROM 72, a table in which the difference correspondence values and the cutting parameters are associated with each other. The cutting device 1 may decide the cutting parameter corresponding to the difference correspondence value by referring to the table.

The cutting device 1 may decide the cutting pressure correspondence value by adding the decided cutting parameter to the first pressure correspondence value.

The cutting pressure correspondence value may be a value between the first pressure correspondence value and the second pressure correspondence value, and a value that is closer to the second pressure correspondence value. In this case, the pressure applied to the mounting portion 32 by the pressure applying mechanism 31 on the basis of the cutting pressure correspondence value may be substantially the same as the pressure applied to the mounting portion 32 by the pressure applying mechanism 31 on the basis of the second pressure correspondence value. Further, in the course of the object to be cut 20 being cut by the cutting blade Cs, the cutting device 1 may gradually change the cutting pressure correspondence value from the second pressure correspondence value toward the first pressure correspondence value.

The user may set the type of the object to be cut 20 in the cutting device 1. The cutting device 1 may decide the non-detection pressure correspondence value corresponding to the type of the set object to be cut 20. When the first non-detection pressure correspondence value is decided as the cutting pressure correspondence value (S43), a number of times the cutting is performed may be limited to a number set in advance. Further, the cutting device 1 may decide the second non-detection pressure correspondence value corresponding to the set type of the object to be cut 20.

The rotation pressure correspondence value corresponding to the pressure applied to the mounting portion 32 by the pressure applying mechanism 31 when changing the blade tip direction of the cutting blade Cs may be the first pressure correspondence value. In other words, the cutting device 1 may perform control such that the blade tip direction of the cutting blade Cs is changed in a state in which the cutting blade Cs is in contact with the upper surface of the object to be cut 20. The cutting device 1 may perform adjustment such that the pressure is applied to the mounting portion 32 by the pressure applying mechanism 31 on the basis of the cutting pressure correspondence value after cutting the line segment. In other words, the blade tip of the cutting blade Cs may move from the first position D1 directly to the third position D3 without passing through the second position D2. The cutting device 1 may perform the adjustment such that the pressure is applied to the mounting portion 32 by the pressure applying mechanism 31 on the basis of the cutting pressure correspondence value after changing the blade tip direction of the cutting blade Cs. In other words, the blade tip of the cutting blade Cs may move from the third position D3 directly to the first position D1 without passing through the fourth position D4.

The method when deciding the rotation pressure correspondence value on the basis of the difference correspondence value, which is the difference between the first pressure correspondence value and the second pressure correspondence value, is not limited to the above-described method. For example, the cutting device 1 may decide, as the rotation pressure correspondence value, a value obtained by subtracting a predetermined amount from the cutting pressure correspondence value. The rotation pressure correspondence value may be a constant value irrespective of the changes in the cutting pressure correspondence value.

The apparatus and methods described above with reference to the various embodiments are merely examples. It goes without saying that they are not confined to the depicted embodiments. While various features have been described in conjunction with the examples outlined above, various alternatives, modifications, variations, and/or improvements of those features and/or examples may be possible. Accordingly, the examples, as set forth above, are intended to be illustrative. Various changes may be made without departing from the broad spirit and scope of the underlying principles.

What is claimed is:

1. A cutting device comprising:

a platen on which a holding member is placeable, the holding member being configured to hold an object to be cut on a holding surface of the holding member;

a mounting portion to which a cutting blade is mountable;

a first motor and second motor configured to relatively move the holding member placed on the platen and the mounting portion in a first direction and a second direction orthogonal to the first direction;

a third motor configured to move the mounting portion in a third direction causing the mounting portion to move closer to the platen, and a fourth direction causing the mounting portion to move away from the platen, the third direction and the fourth direction being orthogonal to the first direction and the second direction;

a pressure applying mechanism configured to apply pressure to the mounting portion in the third direction;

a processor configured to control the first motor and second motor and the third motor; and a memory having computer-readable instructions stored thereon that when executed by the processor, instruct the processor to perform processes comprising:

first movement processing of moving the mounting portion, by controlling the first motor and second motor and the third motor, to a facing position, the facing position being a position facing the object to be cut held by the holding member and at which the cutting blade is away from the object to be cut in the fourth direction;

second movement processing of moving the mounting portion in the third direction from the facing position by controlling the third motor;

first decision processing of deciding a cutting pressure correspondence value corresponding to the pressure applied to the mounting portion by the pressure applying mechanism when cutting the object to be cut using the cutting blade, the deciding being performed based on a first pressure correspondence value corresponding to the pressure applied to the mounting portion by the pressure applying mechanism when it is detected that the cutting blade has come into contact with the object to be cut in the course of the mounting portion being moved in the third direction by the second movement processing, and on a second pressure correspondence value corresponding to the pressure applied to the mounting portion by the pressure applying mechanism when it is detected that the cutting blade has reached the holding surface of the holding member;

acquisition processing of acquiring cutting data for cutting a pattern from the memory; and cutting processing of applying the pressure to the mounting portion by the pressure applying mechanism, based on the cutting pressure correspondence value decided by the first decision processing, and cutting the object to be cut using the cutting blade mounted to the mounting portion, by controlling the first motor and second motor and the third motor in accordance with the cutting data acquired by the acquisition processing.

2. The cutting device according to claim 1, wherein the first decision processing includes deciding the cutting pressure correspondence value, based on a difference between the first pressure correspondence value and the second pressure correspondence value.

3. The cutting device according to claim 2, wherein the pressure corresponding to the cutting pressure correspondence value is larger than the pressure corresponding to the first pressure correspondence value and is smaller than the pressure corresponding to the second pressure correspondence value.

4. The cutting device according to claim 1, wherein the third motor includes a motor configured to rotate by input of a pulse, and is configured to move the mounting portion in the third direction and the fourth direction by a rotation of the motor, the second movement processing includes moving the mounting portion in the third direction by the input of the pulse to the motor, the computer-readable instructions further instruct the processor to perform a process comprising:

first identification processing of identifying, as the first pressure correspondence value, a value corresponding to the pressure applied to the mounting portion by the pressure applying mechanism when a movement amount in the third direction of the mounting portion per pulse input to the motor is equal to or less than a predetermined movement amount, and the first decision processing includes deciding the cutting pressure correspondence value, based on the first pressure correspondence value identified by the first identification processing, and on the second pressure correspondence value.

5. The cutting device according to claim 4, wherein the computer-readable instructions further instruct the processor to perform a process comprising:

second identification processing of identifying, as the second pressure correspondence value, a value corresponding to the pressure applied to the mounting portion by the pressure applying mechanism when, after the first pressure correspondence value is identified by the first identification processing, the movement amount in the third direction of the mounting portion per pulse input to the motor is greater than the predetermined movement amount, and the first decision processing includes deciding the cutting pressure correspondence value, based on the first pressure correspondence value identified by the first identification processing and the second pressure correspondence value identified by the second identification processing.

6. The cutting device according to claim 1, wherein the computer-readable instructions further instruct the processor to perform a process comprising:

second decision processing of deciding a first non-detection pressure correspondence value, when it is not detected that the cutting blade has reached the holding surface of the holding member during a period until a drive condition of the pressure applying mechanism satisfies a predetermined first condition, in the course of the mounting portion moving in the third direction by the second movement processing, and when the first non-detection pressure correspondence value is decided by the second decision processing, the cutting processing includes applying the pressure to the mounting portion by the pressure applying mechanism based on the first non-detection pressure correspondence value, and cutting the object to be cut a plurality of times, using the cutting blade mounted to the mounting portion.

7. The cutting device according to claim 1, wherein the computer-readable instructions further instruct the processor to perform a process comprising:

third decision processing of deciding a second non-detection pressure correspondence value, when it is not detected that the cutting blade has come into contact with the object to be cut during a period until a drive condition of the pressure applying mechanism satisfies a predetermined second condition, in the course of the mounting portion moving in the third direction by the second movement processing, and when the second non-detection pressure correspondence value is decided by the third decision processing, the cutting processing includes applying the pressure to the mounting portion by the pressure applying mechanism based on the second non-detection pressure correspondence value, and cutting the object to be cut, using the cutting blade mounted to the mounting portion.

8. The cutting device according to claim 1, wherein the cutting data is data for cutting, from the object to be cut, the pattern including a first line segment and a second line segment, the first line segment having a first end portion and a second end portion, the second line segment having a third end portion and a forth end portion, the second end portion of the first line segment and the third end portion of the second line segment being connected to each other, the first line segment and the second line segment extending in different directions, and when cutting the pattern from the object to be cut based on the cutting data, the cutting processing includes first control for applying the pressure to the mounting portion by the pressure applying mechanism, based on the cutting pressure correspondence value, by controlling the first motor and second motor and the third motor, and cutting the first line segment from the first end portion toward the second end portion, in a state in which the cutting blade is disposed at a first position, the first position being a position further to the third direction side than a surface of the object to be cut, second control for moving the mounting portion, by controlling the third motor after the first control, to dispose the cutting blade at a second position, the second position being a position further to the fourth direction side than the surface of the object to be cut, third control for moving the mounting portion in the third direction, by controlling the third motor after the second control, to dispose the cutting blade at a third position, the third position being a position further to the third direction side than the surface of the object to be cut, and further to the fourth direction side than the first position, and fourth control for, after the third control, applying the pressure to the mounting portion by the pressure applying mechanism, based on a rotation pressure correspondence value corresponding to the pressure that is smaller than the pressure identified using the cutting pressure correspondence value, and changing an orientation of the cutting blade by controlling the first motor and second motor, to change the orientation from an orientation able to cut the first line segment to an orientation able to cut the second line segment.

9. The cutting device according to claim 8, wherein the cutting processing includes fifth control for, after the fourth control, applying the pressure to the mounting portion by the pressure applying mechanism, based on the cutting pressure correspondence value, and moving the mounting portion in the third direction, by controlling the third motor, and sixth control for cutting, after the fifth control, the second line segment from the third end portion toward the forth end portion, by controlling the first motor and second motor in a state in which the cutting blade is disposed in the first position.

10. The cutting device according to claim 9, wherein the fifth control includes after the fourth control, applying the pressure to the mounting portion by the pressure applying mechanism, based on a value that is larger than the cutting pressure correspondence value, and moving the mounting portion in the third direction, by controlling the third motor, and after that, applying the pressure to the mounting portion by the pressure applying mechanism, based on the cutting pressure correspondence value, and moving the mounting portion in the fourth direction.

11. The cutting device according to claim 8, wherein the computer-readable instructions further instruct the processor to perform a process comprising:

fourth decision processing of deciding the rotation pressure correspondence value, based on a difference between the first pressure correspondence value and the second pressure correspondence value.

12. The cutting device according to claim 8, wherein the computer-readable instructions further instruct the processor to perform a process comprising:

fifth decision processing of deciding the rotation pressure correspondence value to be a value that is larger the larger the cutting pressure correspondence value.

* * * * *